(12) United States Patent
Takamatsu

(10) Patent No.: US 10,586,966 B2
(45) Date of Patent: *Mar. 10, 2020

(54) COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

(71) Applicant: ZEON CORPORATION, Chiyoda-ku, Tokyo (JP)

(72) Inventor: Hiromi Takamatsu, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 103 days.

This patent is subject to a terminal disclaimer.

(21) Appl. No.: 15/527,067

(22) PCT Filed: Nov. 16, 2015

(86) PCT No.: PCT/JP2015/005706
§ 371 (c)(1),
(2) Date: May 16, 2017

(87) PCT Pub. No.: WO2016/084330
PCT Pub. Date: Jun. 2, 2016

(65) Prior Publication Data
US 2018/0130987 A1    May 10, 2018

(30) Foreign Application Priority Data

Nov. 28, 2014   (JP) ................................ 2014-241672

(51) Int. Cl.
| | |
|---|---|
| *C08L 9/00* | (2006.01) |
| *H01M 2/16* | (2006.01) |
| *H01M 4/13* | (2010.01) |
| *H01M 4/62* | (2006.01) |
| *H01M 10/0565* | (2010.01) |
| *H01M 4/131* | (2010.01) |
| *H01M 10/052* | (2010.01) |
| *H01M 4/02* | (2006.01) |

(52) U.S. Cl.
CPC ............ *H01M 2/1653* (2013.01); *C08L 9/00* (2013.01); *H01M 2/162* (2013.01); *H01M 2/1666* (2013.01); *H01M 2/1673* (2013.01); *H01M 2/1686* (2013.01); *H01M 4/13* (2013.01); *H01M 4/622* (2013.01); *H01M 10/0565* (2013.01); *C08L 2207/53* (2013.01); *H01M 4/131* (2013.01); *H01M 10/052* (2013.01); *H01M 2004/028* (2013.01)

(58) Field of Classification Search
CPC ....... C08L 9/00; H01M 2/162; H01M 2/1673; H01M 4/13; H01M 4/622; H01M 10/0565; H01M 2/1653; H01M 2/1666; H01M 2/1273; H01M 2/1686; H01M 10/565

USPC ......................................................... 523/201
See application file for complete search history.

(56) References Cited

U.S. PATENT DOCUMENTS

| | | | | |
|---|---|---|---|---|
| 9,917,287 | B2 * | 3/2018 | Toyoda | H01M 2/145 |
| 10,177,362 | B2 * | 1/2019 | Akiike | H01M 2/16 |
| 10,186,699 | B2 * | 1/2019 | Sasaki | H01M 4/13 |
| 10,193,119 | B2 * | 1/2019 | Sasaki | H01M 2/145 |
| 10,454,084 | B2 * | 10/2019 | Asai | C08L 33/26 |
| 2012/0177991 | A1 | 7/2012 | Mogi et al. | |
| 2015/0240039 | A1 * | 8/2015 | Katsuda | H01G 11/52 429/214 |
| 2017/0309916 | A1 * | 10/2017 | Toyoda | H01M 2/16 |
| 2018/0053963 | A1 * | 2/2018 | Tanaka | H01M 2/16 |
| 2018/0212218 | A1 * | 7/2018 | Asai | H01M 2/16 |
| 2018/0309916 | A1 * | 10/2018 | Park | H04N 5/2253 |
| 2018/0327639 | A1 * | 11/2018 | Tanaka | C09J 7/00 |
| 2018/0342711 | A1 * | 11/2018 | Asai | C09J 201/00 |
| 2019/0036164 | A1 * | 1/2019 | Matsuzaki | C08F 220/06 |
| 2019/0044147 | A1 * | 2/2019 | Yamamoto | C08L 9/06 |
| 2019/0044148 | A1 * | 2/2019 | Yamamoto | C08L 9/00 |

FOREIGN PATENT DOCUMENTS

| | | |
|---|---|---|
| CN | 102473921 A | 5/2012 |
| JP | 2011165430 A | 8/2011 |
| JP | 2013145763 A | 7/2013 |
| JP | 2014209432 A | 11/2014 |
| JP | 2014212122 A | 11/2014 |

(Continued)

OTHER PUBLICATIONS

May 30, 2017, International Preliminary Report on Patentability issued in the International Patent Application No. PCT/JP2015/005706.
Charles M. Hansen, "Hansen Solubility Parameters: A User's Handbook, Second Edition", CRC Press, Inc., 2007.
Feb. 16, 2016, International Search Report issued in the International Patent Application No. PCT/JP2015/005706.

*Primary Examiner* — Hannah J Pak
(74) *Attorney, Agent, or Firm* — Kenja IP Law PC

(57) ABSTRACT

To provide a technique of trapping transition metal ions such as cobalt ions dissolved from positive electrode active material in a secondary battery to prevent deposition of transition metal on the negative electrode. Disclosed is a composition for non-aqueous secondary battery functional layer which contains organic particles containing an aliphatic conjugated diene monomer unit at an amount of 5% by mass or more based on the total monomer units in the organic particles, wherein the composition comprises the organic particles at an amount of 50% by mass or more in terms of solid content.

6 Claims, 1 Drawing Sheet

(56) References Cited

FOREIGN PATENT DOCUMENTS

JP  2014212132 A  11/2014
WO  2011016563 A1  2/2011

* cited by examiner

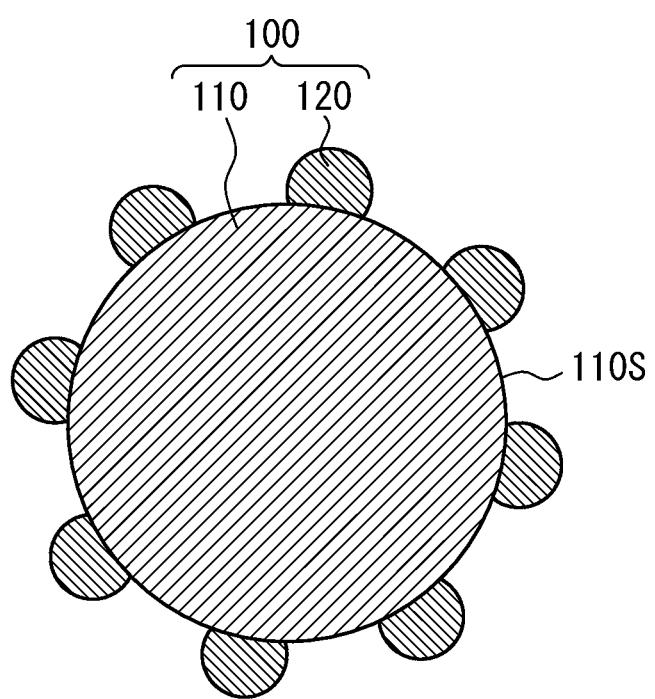

COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

TECHNICAL FIELD

This disclosure is directed to compositions for non-aqueous secondary battery functional layer, functional layers for non-aqueous secondary battery, and non-aqueous secondary batteries.

BACKGROUND

Non-aqueous secondary batteries (hereinafter may simply referred to as "secondary batteries") such as lithium ion secondary batteries are small and light, high in energy density, and capable of repeated cycles of charge and discharge. For such characteristics, secondary batteries are used in a wide variety of applications. A secondary battery typically includes battery members such as a positive electrode, a negative electrode, and a separator for separating the positive and negative electrodes from each other to prevent a short-circuit between them.

In recent years, secondary battery members have been used that have a porous membrane layer for increasing heat resistance and strength, an adhesive layer for bonding together battery members and other like layers (hereinafter such layers may be collectively referred to as "functional layers"). Specifically, electrodes that include a functional layer formed on an electrode substrate formed of an electrode mixed material layer provided on a current collector, and separators that include a functional layer formed on a separator substrate have been used as battery members.

Extensive improvements have been made on functional layers in an aim to achieve higher performance of secondary batteries that have battery members having such functional layers (see, e.g., PTL 1).

Specifically, for example, PTL 1 proposes using as a binder a carboxyl-modified diene polymer containing an aliphatic conjugated diene monomer unit at an amount of 5 to 85% by mass in porous membrane layers that contain fillers and binders to increase the binding strength of the porous membrane layer while limiting binder aggregation.

CITATION LIST

Patent Literature

PTL 1: JP-A No. 2011-165430A

SUMMARY

Technical Problem

In recent years, from the perspective of achieving higher battery performance such as larger capacity, as the electrode mixed material layer of the positive electrode of secondary battery (positive electrode mixed material layer), positive electrode mixed material layers have been used that contain a transition metal-containing positive electrode active material (e.g., $LiCoO_2$). However, in a secondary battery where transition metal-containing positive electrode active material is used, the transition metal in the positive electrode active material (e.g., cobalt in the case of $LiCoO_2$) may be dissolved into the electrolysis solution in the form of transition metal ions due to side reactions or other events associated with the use of the transition metal. There is a concern that the transition metal dissolved into the electrolysis solution from the positive electrode deposits on the negative electrode and compromises life characteristics of the secondary battery, such as cycle characteristics.

However, attention in the field of secondary batteries has been mainly focused on the techniques of increasing the battery performance by improving physical properties of battery members themselves such as porous membrane layers; only limited studies have been made to address the foregoing problem of dissolution of transition metals. Therefore, for secondary batteries that use transition metal-containing positive electrode active materials, there are needs for providing a technique of trapping transition metal ions such as cobalt ions dissolved from the positive electrode active material within the secondary battery before they migrate to the vicinity of the negative electrode to prevent deposition of the transition metal ions on the negative electrode.

Solution to Problem

The inventor has made extensive studies to provide a technique of trapping transition metal ions such as cobalt ions dissolved into the electrolysis solution from the positive electrode active material. As a result, the inventor has arrived at trapping transition metal ions such as cobalt ions dissolved into the electrolysis solution from the positive electrode active material of the positive electrode mixed material layer by conferring to battery member functional layers a function of trapping transition metal ions. With additional studies, the inventor established that by forming a functional layer using organic particles that contain a specific amount of an aliphatic conjugated diene monomer unit and by regulating the amount of the organic particles in the function layer, it is possible to allow the functional layer to have a high ability of transition metal trapping while ensuring high adhesion of the functional layer. This discovery led to the present disclosure.

By the phase "contain a monomer unit" as used herein is meant that "a structural unit derived from a monomer is contained in a polymer obtained using that monomer."

It would therefore be helpful to advantageously solve the foregoing problem. The disclosed composition for non-aqueous secondary battery functional layer comprises organic particles containing an aliphatic conjugated diene monomer unit at an amount of 5% by mass or more based on the total monomer units in the organic particles, wherein the composition comprises the organic particles at an amount of 50% by mass or more in terms of solid content. By using organic particles containing a specific amount of an aliphatic conjugated diene monomer unit and setting the amount of the organic particles in terms of solid content to as large as 50% by mass or more, it is possible to provide a functional layer having a high ability of transition metal trapping while ensuring high adhesion.

When the organic particle consists of more than polymer in the present disclosure, the phrase "total monomer units in the organic particle" means a total of monomer units in all of the polymers constituting the organic particle.

In the disclosed composition for non-aqueous secondary battery functional layer, the organic particles preferably have a degree of swelling in electrolysis solution of 4 times to 30 times. When the organic particles have a degree of swelling in electrolysis solution that falls within this range, it is possible not only to increase adhesion of the functional layer but also to limit dissolution of the organic particles into the electrolysis solution to further improve high-temperature cycle characteristics of secondary batteries.

In the present disclosure the "degree of swelling in electrolysis solution" of organic particles can be measured using the measurement method described in Examples of the specification.

Further, in the disclosed composition for non-aqueous secondary battery functional layer, the organic particles preferably have a volume-average particle diameter D50 of 250 nm to 1,000 nm. When the organic particles have a volume-average particle diameter D50 that falls within this range, it is possible not only to enhance adhesion of the functional layer to improve high-temperature cycle characteristics of secondary batteries, but also to limit rises in internal resistance to improve low-temperature output characteristics of secondary batteries.

In the present disclosure the "volume-average particle diameter D50" of organic particles can be measured using the measurement method described in Examples of the specification.

Further, in the disclosed composition for non-aqueous secondary battery functional layer, the organic particles preferably have a core-shell structure having a core and a shell that partially covers the outer surface of the core, wherein the core is made of polymer having a degree of swelling in electrolysis solution of 5 times to 30 times and the shell is made of polymer having a degree of swelling in electrolysis solution of greater than 1 time to 4 times. With the organic particles having a core-shell structure whose core and shell are made of polymers having specific values for degree of swelling in electrolysis solution, it is possible not only to enhance adhesion of the functional layer and to limit dissolution of the organic particles into electrolysis solution to improve high-temperature cycle characteristics of secondary batteries, but also to improve low-temperature output characteristics of secondary batteries.

In the present disclosure the "degree of swelling in electrolysis solution" of core and shell polymers can be measured using the measurement method described in Examples of the specification.

It would be helpful to advantageously solve the foregoing problem and the disclosed functional layer for non-aqueous secondary battery is formed using any of the compositions for non-aqueous secondary battery functional layer described above. Using any of the compositions described above, it is possible to provide a functional layer having a high ability of transition metal trapping while ensuring high adhesion.

It would be helpful to advantageously solve the foregoing problem and the disclosed non-aqueous secondary battery includes the functional layer for non-aqueous secondary battery described above, and a positive electrode mixed material layer containing a transition metal-containing positive electrode active material. By providing the functional layer described above, it is possible to trap, by means of the functional layer, transition metal ions such as cobalt ions dissolved from the positive electrode active material into the electrolysis solution. It is thus possible to provide a non-aqueous secondary battery having superior life characteristics such as cycle characteristics.

Advantageous Effect

According to the present disclosure, it is possible to provide a composition for non-aqueous secondary battery functional layer which allows for the formation of a functional layer having a high ability of transition metal trapping while ensuring high adhesion.

According to the present disclosure, it is also possible to provide a functional layer for non-aqueous secondary battery having a high ability of transition metal trapping while ensuring high adhesion.

Further, according to the present disclosure, it is possible to provide a non-aqueous secondary battery having superior life characteristics such as cycle characteristics.

BRIEF DESCRIPTION OF THE DRAWINGS

In the accompanying drawing:

FIG. 1 is a cross-sectional view schematically illustrating a structure of an example of an organic particle contained in the disclosed composition for non-aqueous secondary battery functional layer.

DETAILED DESCRIPTION

Embodiments of the present disclosure will now be described, which however shall not be construed as limiting the present disclosure.

The disclosed composition for non-aqueous secondary battery functional layer is used for forming a functional layer such as a porous membrane layer or an adhesive layer and can be used when forming the disclosed functional layer for non-aqueous secondary battery. The disclosed non-aqueous secondary battery includes the disclosed functional layer for non-aqueous secondary battery.

(Composition for Non-Aqueous Secondary Battery Functional Layer)

The disclosed composition for non-aqueous secondary battery functional layer contains organic particles containing an aliphatic conjugated diene monomer unit at an amount of 5% by mass or more based on the total monomer units in the organic particles, and the disclosed composition for non-aqueous secondary battery functional layer comprises the organic particles at an amount of 50% by mass or more in terms of solid content.

The composition for non-aqueous secondary battery functional layer optionally contains a functional layer particulate polymer and additional component(s). Further, when the functional layer formed using the composition for non-aqueous secondary battery functional layer functions as a porous membrane layer (i.e., when the composition for non-aqueous secondary battery functional layer is a composition for non-aqueous secondary battery functional layer porous membrane layer), typically, the composition further contains non-conductive particles (except for those corresponding to the organic particles and the functional layer particulate polymer).

<Organic Particles>

With organic particles containing an aliphatic conjugated diene monomer unit at an amount of 5% by mass or more based on the total monomer units being contained at an amount of 50% by mass or more in the composition in terms of solid content, it is possible not only for the functional layer formed using the disclosed composition for non-aqueous secondary battery functional layer to have a superior ability of transition metal trapping and superior adhesion, but also for a secondary battery having such a functional layer to have superior life characteristics such as cycle characteristics.

The organic particles are typically present in particulate form in dispersing medium such as water rather than in the form of a water-soluble polymer, and may be contained in the functional layer while retaining their particulate form.

The organic particles need to contain an aliphatic conjugated diene monomer unit at an amount of 5% by mass to 100% by mass based on the total monomer units contained in the organic particles, and may optionally contain additional monomer unit(s).

The organic particles may be made of a composite polymer composed of a plurality of polymers, and preferably have a specific core-shell structure whose core and shell are made of polymers of specific degrees of swelling in electrolysis solution.

Either one or more different types of organic particles may be used. Two or more different types of organic particles may be used in combination with the proviso that the percentage of the total organic particles is 50% by mass or more in the composition.

[Aliphatic Conjugated Diene Monomer Unit]

Examples of aliphatic conjugated diene monomers which may form the aliphatic conjugated diene monomer unit include 1,3-butadiene, 2-methyl-1,3-butadiene (isoprene), 2,3-dimethyl-1,3-butadiene, 2-chloro-1,3-butadiene (chloroprene), substituted linear conjugated pentadienes, and substituted and side-chain conjugated hexadienes. Of these aliphatic conjugated diene monomers, preferred is 1,3-butadiene from the perspective of effectively increasing the ability of organic particle-containing functional layers to trap transition metals.

These aliphatic conjugated diene monomers may be used alone or in combination.

The percentage of the aliphatic conjugated diene monomer unit contained in the total monomer units in the organic particles needs to be 5% by mass or more, preferably 7% by mass or more, more preferably 8% by mass or more, even more preferably 9% by mass or more, and preferably 80% by mass or less, more preferably 60% by mass or less, even more preferably 50% by mass or less, particularly preferably 45% by mass or less. When the percentage of the aliphatic conjugated diene monomer unit is less than 5% by mass, it results in failure to obtain a functional layer having a sufficient ability of transition metal trapping, which in turn results in failure to obtain a secondary battery having superior life characteristics such as cycle characteristics. By setting the percentage of the aliphatic conjugated diene monomer unit to be not greater than the upper limit of the range described above, it is possible for the organic particles to have a suitable level of degree of swelling in electrolysis solution, as well as it is possible to increase adhesion of the functional layer.

[Additional Monomer Units]

The organic particles may contain additional monomer unit(s) other than the aliphatic conjugated diene monomer unit described above. Examples of monomers for such additional monomer units include vinyl chloride-based monomers such as vinyl chloride and vinylidene chloride; vinyl acetate-based monomers such as vinyl acetate; aromatic vinyl monomers such as styrene, α-methylstyrene, styrene sulfonic acid, butoxystyrene, and vinylnaphthalene; vinylamine-based monomers such as vinylamine; vinylamide-based monomers such as N-vinylformamide and N-vinylacetamide; acid group-containing monomers such as carboxyl group-containing monomers, sulfonate group-containing monomers, phosphate group-containing monomers, and hydroxyl group-containing monomers; (meth)acrylic acid alkyl ester monomers such as methyl acrylate, ethyl acrylate, methyl methacrylate, ethyl methacrylate, and 2-ethylhexyl acrylate; (meth)acrylamide monomers such as acrylamide and methacrylamide; (meth)acrylonitrile monomers such as acrylonitrile and methacrylonitrile; fluorine-containing (meth)acrylate monomers such as 2-(perfluorohexyl)ethyl methacrylate and 2-(perfluorobutyl)ethyl acrylate; maleimide; maleimide derivatives such as phenylmaleimide; divinyl compounds such as divinyl benzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylol propane trimethacrylate, and trimethylol propane triacrylate; and epoxy group-containing ethylenically unsaturated monomers such as allyl glycidyl ether, and glycidyl methacrylate.

As used herein, the term "(meth)acryl" refers to acryl and/or methacryl, the term "(meth)acrylo" refers to acrylo and/or methacrylo, and the term "(meth)acrylate" refers to acrylate and/or methacrylate.

[Method of Producing Organic Particles]

The organic particles are prepared by polymerization of a monomer composition containing the monomers described above. In general, the percentages of the monomers in the monomer composition are the same as those of the corresponding monomer units in desired organic particles.

Any mode of polymerization can be used; for example, solution polymerization, suspension polymerization, bulk polymerization, emulsion polymerization or other any polymerization method can be used. As the polymerization reaction, addition polymerization such as ionic polymerization, radical polymerization or living radical polymerization can be used. Emulsifiers, dispersants, polymerization initiators, polymerization promoters and other agents commonly used for polymerization can be used at amounts commonly used in the art.

[[Properties of Organic Particles]]

The organic particles prepared by the method described above preferably have properties described below.

[[Volume-Average Particle Diameter D50 of Organic Particles]]

The organic particles preferably have a volume-average particle diameter D50 of 250 nm or more, more preferably 300 nm or more, even more preferably 400 nm or more, and preferably 1,000 nm or less, more preferably 900 nm or less, even more preferably 700 nm or less, particularly preferably 550 nm or less. By setting the volume-average particle diameter D50 of the organic particles to be not less than the lower limit of the range described above, it is possible to limit rises in internal resistance to improve low-temperature output characteristics of secondary batteries. By setting the volume-average particle diameter D50 of the organic particles to be not greater than the upper limit of the range described above, it is possible to increase adhesion of the functional layer in electrolysis solution to improve cycle characteristics of secondary batteries.

[[Degree of Swelling in Electrolysis Solution of Organic Particles]]

The organic particles preferably have a degree of swelling in electrolysis solution of 4 times or more, more preferably 4.5 times or more, even more preferably 5 times or more, and preferably 30 times or less, more preferably 25 times or less, even more preferably 20 times or less. When the degree of swelling in electrolysis solution of the organic particles is not less than the lower limit of the range described above, it is possible to increase adhesion of the functional layer in electrolysis solution. When the degree of swelling in electrolysis solution of the organic particles is not greater than upper limit of the range described above, it is possible to limit dissolution of the organic particles into electrolysis solution to improve cycle characteristics of secondary batteries.

An exemplary method of adjusting the degree of swelling in electrolysis solution of the organic particles is to properly select the types and amounts of monomers used for the production of the organic particle in consideration of the SP value of the electrolysis solution, or to adjust the degree of cross-linking and molecular weight of the polymer of the organic particles.

In general, when a polymer has an SP value close to that of electrolysis solution, the polymer tends to swell in the electrolysis solution.

On the other hand, when a polymer has an SP value far from that of electrolysis solution, the polymer tends to be less likely to swell in the electrolysis solution.

The SP value as used herein means a solubility parameter.

The SP value can be calculated using the method introduced in "Hansen Solubility Parameters A User's Handbook, 2nd Ed (CRCPress)".

Further, an SP value of an organic compound can be estimated based on the molecular structure of the organic compound. Specifically, SP values may be calculated using simulation software capable of calculation of SP values using the SMILE equation (e.g., "HSPiP" (http=//www.hansen-solubility.com)). In this simulation software, SP values are calculated based on the theory described in "Hansen SOLUBILITY PARAMETERS A User's Handbook Second Edition, Charles M. Hansen."

[Glass-Transition Temperature of Organic Particles]

The organic particles preferably have a glass transition temperature of −20° C. or above, more preferably above 30° C., even more preferably 50° C. or above, particularly preferably 80° C. or above, and preferably 200° C. or below, more preferably 180° C. or below, even more preferably 150° C. or below.

When the organic particles have been observed to have more than one glass-transition temperature, the highest glass-transition temperature is defined as the glass-transition temperature of the organic particles.

By setting the glass-transition temperature of the organic particles to fall within the range described above, it is possible to increase ion conductivity of the functional layer for non-aqueous secondary battery to improve low-temperature output characteristics of non-aqueous secondary batteries.

[Amount of Organic Particles]

The composition for non-aqueous secondary battery functional layer needs to contain the organic particles at an amount of 50% by mass to 100% by mass in terms of solid content, preferably 60% by mass or more, more preferably 70% by mass or more, even more preferably 75% by mass or more, particularly preferably 80% by mass or more. By setting the amount of the organic particles in the composition to fall within the range described above, it is possible not only to increase adhesion of the functional layer in electrolysis solution but also to increase the ability of the functional layer to trap transition metals. It is also possible to improve low-temperature output characteristics of non-aqueous secondary batteries.

[Structure of Organic Particles]

The organic particles may have any structure as long as they have particulate form, and the organic particles may be particles made of one polymer or particles made of composite polymer of two or more different polymers. In particular, the organic particles are preferably made of composite polymer having a specific core-shell structure whose core and shell are made of polymers of specific degrees of swelling in electrolysis solution. Specifically, the organic particles preferably have a core-shell structure having a core and a shell that partially covers the outer surface of the core, wherein the core is made of polymer having a degree of swelling in electrolysis solution of 5 times to 30 times and the shell is made of polymer having a degree of swelling in electrolysis solution of greater than 1 time to 4 times. With organic particles having such a specific core-shell structure and such a specific degree of swelling in electrolysis solution, it is possible not only to enhance adhesion of the functional layer in electrolysis solution and to limit dissolution of the organic particles into the electrolysis solution to improve high-temperature cycle characteristics of secondary batteries, but also to improve low-temperature output characteristics of secondary batteries.

Even when the core outer surface seems to be completely covered by a shell by its appearance, the shell is equated to a shell that partially covers the core outer surface in cases where the shell has a pore that communicates between inside and outside of the shell. Accordingly, the organic particles having the specific core-shell structure encompass, for example, such organic particles with a shell having a fine pore that communicates from the shell outer surface (i.e., peripheral surface of the organic particle) to the core outer surface.

A possible but still uncertain reason why the use of organic particles having such a specific core-shell structure and such a specific degree of swelling in electrolysis solution results in such a superior effect described above will now be described.

Specifically, the shell polymer of the organic particle swells in contact with electrolysis solution. At this time, due for example to activation of the functional groups of the swollen polymer in the shell followed by chemical or electrical interactions of these functional groups with functional groups present on the surface of a substrate on which a functional layer is formed (e.g., separator substrate or electrode substrate) and on the surface of a battery member bonded with the functional layer, the shell can be firmly bound to the substrate and battery member in electrolysis solution. Thus, it is presumed that a functional layer containing such organic particles enables battery members (e.g., separator and electrode) to be firmly bound to one another in electrolysis solution.

Further, since the use of a functional layer containing the organic particles as an adhesive layer can provide firm adhesion between a separator and an electrode in electrolysis solution as described above, in a secondary battery including such a functional layer, space is not easily formed between the battery members (e.g., between separator and electrode) bonded together with the functional layer. Thus, in a secondary battery including a functional layer containing the organic particles, the distance between the positive and negative electrodes does not easily increase in the secondary battery, the internal resistance of the secondary battery can be lowered, and the reaction field of electrochemical reactions in the electrode does not easily become non-uniform. It is presumed that this results in superior low-temperature output characteristics. Further, in the secondary battery, space is not easily formed between the separator and electrode even after repeated cycles of charge and discharge, and thus the battery capacity does not easily decrease. It is presumed that this results in superior high-temperature cycle characteristics.

Further, the core polymer of the organic particle greatly swells in contact with electrolysis solution. With the polymer greatly swollen in electrolysis solution, intermolecular space of the polymer becomes large allowing ions to easily pass through between the molecules. Also, the core polymer of the organic particle is not completely covered with the shell. Thus, ions are more likely to pass through the core in electrolysis solution, and therefore the organic particles can exert high ion diffusivity. Accordingly, using the organic particles described above, it is also possible to limit increases in resistance due to the functional layer to limit reductions in low-temperature output characteristics.

When not swollen in electrolysis solution, the shell polymer does not generally exhibit adhesion but does so only after swollen in electrolysis solution. For this reason, the organic particles do not generally exert adhesion when they are not swollen in electrolysis solution. Therefore, a functional layer containing the organic particles does not generally exert great adhesion when not swollen in electrolysis solution, and it is assumed that a battery member that includes the functional layer on a substrate such as a separator substrate does not easily undergo blocking even when stacked. It is not that the organic particles do not exert adhesion at all as long as they do not swell in contact with electrolysis solution; they may exert adhesion when, for example, heated to a given temperature or higher (e.g., 50° C. or higher) even when not swollen in electrolysis solution.

When the organic particles have the specific core-shell structure, the aliphatic conjugated diene monomer unit may be contained only in the core polymer, may be contained only in the shell polymer, or may be contained in both of the core and shell polymers at given ratios. It is to be noted that in the organic particles having the specific core-shell structure, the core outer surface is not completely with the shell even when the aliphatic conjugated diene monomer unit is contained in the core polymer. Hence, it is possible to attain a transition metal trapping ability also by the aliphatic conjugated diene monomer unit contained in the core polymer.

From the perspective of sufficiently increasing adhesion of the functional layer and easily adjusting the glass-transition temperatures of the core and shell, it is preferred that the aliphatic conjugated diene monomer be contained only in the core or both of the core and shell.

Further, when the organic particles have the specific core-shell structure, it is preferred that the organic particles satisfy, as whole particles including core and shell, the above-described volume-average particle diameter D50 and/or degree of swelling in electrolysis solution.

The shell of an organic particle having the specific core-shell structure preferably comprises a plurality of shell portions.

Specifically, as illustrated in FIG. 1 which illustrates a cross-sectional structure of an example of an organic particle, an organic particle 100 preferably has a core-shell structure having a core 110 and a shell formed of a plurality of shell portions 120. The core 110 refers to a portion which is present inward from the shell in the organic particle 100. The shell portions 120 cover an outer surface 110S of the core 110, and the shell formed of the shell portions 120 generally refers to an outermost portion of the organic particle 100. The shell formed of the shell portions 120 does not cover the entire outer surface 110S of the core 110, but partially covers the outer surface 110S of the core 110.

[[Ratio of Coverage]]

For the organic particles having the specific core-shell structure, the average ratio of shell coverage on the core outer surface (hereinafter "ratio of coverage") is preferably 10% or more, more preferably 40% or more, even more preferably 55% or more, particularly preferably 60% or more, and preferably 99% or less, more preferably 95% or less, even more preferably 85% or less, particularly preferably 70% or less. By setting the ratio of coverage to be not less than the lower limit of the range described above, it is possible to increase anti-blocking property of the functional layer before immersion into electrolysis solution, adhesion of the functional layer in electrolysis solution, and high-temperature cycle characteristics of secondary batteries. By setting the ratio of coverage to be not greater than the upper limit of the range described above, it is possible not only to increase ion diffusivity to improve low-temperature output characteristics of secondary batteries, but also to improve low-temperature shutdown characteristics of secondary batteries. Further, it is possible to increase heat-press adhesion of the functional layer.

The ratio of coverage may be measured based on observation of organic particles. Specifically, the ratio of coverage may be measured by the method described below.

First, organic particles are fully dispersed in room temperature-curable epoxy resin and then embedded to form a block piece containing the organic particles. A thin slice of 80-200 nm thickness is then cut from the block piece using a microtome equipped with a diamond blade to prepare a measurement specimen. Thereafter, where necessary, the measurement specimen is subjected to dying treatment using, for example, ruthenium tetroxide or osmium tetroxide.

The measurement specimen is then loaded into a transmission electron microscope (TEM), and an image of cross-sectional structures of the organic particles is captured. The magnification of the electron microscope is preferably such that a cross-section of one organic particle is within the field of view. Specifically, the magnification is preferably on the order of 10,000×.

In the cross-sectional structure of a captured organic particle image, length D1 (circumferential length of core, corresponding to the core outer surface) and length D2 (length of a part where the core outer surface contacts the shell) are measured. Using lengths D1 and D2 measured, the ratio of shell coverage on the core outer surface of that organic particle (Rc) is calculated using the following Equation (1):

$$\text{Ratio of coverage Rc } (\%) = (D2/D1) \times 100 \quad (1)$$

The ratio of coverage (Rc) is measured for 20 or more organic particles, and an average the measured ratios of coverage is calculated to find an average ratio of shell coverage on the core outer surface.

Although the ratio of coverage (Rc) can be calculated manually based on cross-sectional structures of organic particles, calculation can be made using commercially available image analysis software. For example, "AnalySIS Pro" (Olympus Corporation) can be used as such commercially available image analysis software.

The organic particles having the specific core-shell structure may have optional component(s) other than the core and shell as long as such component(s) do not significantly compromise expected effects. Specifically, for example, the organic particle may have inside the core a portion made of different polymer than the core. By way of specific example, seed particles which were used when producing the organic particles by seed polymerization may remain inside the core. However, from the perspective that the organic particles can exert significant levels of expected effects, the organic particles preferably have only a core and a shell.

[[Core]]

—Degree of Swelling in Electrolysis Solution of Core Polymer—

The core of the organic particle having the specific core-shell structure is preferably made of polymer having a specific degree of swelling in electrolysis solution. Specifically, the core polymer preferably has a degree of swelling in electrolysis solution of 5 times or more, more preferably 6 times or more, even more preferably 7 times or more, and preferably 30 times or less, more preferably 20 times or less, even more preferably 15 times or less, particularly preferably 10 times or less. By setting the degree of swelling in electrolysis solution of the core polymer to be not less than the lower limit of the range described above, it is possible to increase adhesion of the functional layer to improve low-temperature output characteristics of secondary batteries. By setting the degree of swelling in electrolysis solution of the core polymer to be not greater than the upper limit of the range described above, it is possible to limit dissolution of the organic particles into electrolysis solution to improve high-temperature cycle characteristics of secondary batteries.

—Glass-Transition Temperature of Core Polymer—

The core polymer preferably has a glass-transition temperature of −20° C. or above, more preferably 0° C. or above, even more preferably 10° C. or above, and preferably 100° C. or below, more preferably 95° C. or below, even more preferably 90° C. or below. By setting the glass-transition temperature of the core polymer to be not less than the lower limit of the range described above, it is possible to stably retain the core-shell structure of the organic particles. By setting the glass-transition temperature of the core polymer to be not greater than the upper limit of the range described above, it is possible to increase adhesion of the functional layer in electrolysis solution.

—Composition of Core Polymer—

Monomers used for the preparation of the core polymer are appropriately selected from aliphatic conjugated diene monomers which may form the above-described aliphatic conjugated diene monomer unit and may also be selected from monomers that allow the resulting core polymer to have a desired degree of swelling in electrolysis solution with the proviso that the percentage of the above-described aliphatic conjugated diene monomer unit in the organic particles becomes 5% by mass or more. Examples of such monomers include vinyl chloride-based monomers such as vinyl chloride and vinylidene chloride; vinyl acetate-based monomers such as vinyl acetate; aromatic vinyl monomers such as styrene, α-methylstyrene, styrene sulfonic acid, butoxystyrene, and vinylnaphthalene; vinylamine-based monomers such as vinylamine; vinylamide-based monomers such as N-vinylformamide and N-vinylacetamide; (meth)acrylic acid alkyl ester monomers such as methyl acrylate, ethyl acrylate, methyl methacrylate, ethyl methacrylate, and 2-ethylhexyl acrylate; (meth)acrylamide monomers such as acrylamide and methacrylamide; (meth)acrylonitrile monomers such as acrylonitrile and methacrylonitrile; fluorine-containing (meth)acrylate monomers such as 2-(perfluorohexyl)ethyl methacrylate and 2-(perfluorobutyl)ethyl acrylate; maleimide; and maleimide derivatives such as phenylmaleimide. These monomers may be used alone or in combination at any ratio.

The core polymer preferably contains the aliphatic conjugated diene monomer unit.

In addition to the aliphatic conjugated diene monomer unit, the core polymer preferably contains a (meth)acrylic acid alkyl ester monomer unit or a (meth)acrylonitrile monomer unit, more preferably contains a (meth)acrylic acid alkyl ester monomer unit, particularly preferably contains a monomer unit derived from methyl methacrylate. This makes it easy to regulate the degree of swelling of the core polymer.

The percentage of the (meth)acrylic acid alkyl ester monomer unit in the core polymer is preferably 10% by mass or more, more preferably 20% by mass or more, even more preferably 30% by mass or more, and preferably 70% by mass or less, more preferably 65% by mass or less, even more preferably 60% by mass or less. By setting the percentage of the (meth)acrylic acid alkyl ester monomer unit to be not less than the lower limit of the range described above, it is possible to improve low-temperature output characteristics of secondary batteries. By setting the percentage of the (meth)acrylic acid alkyl ester monomer unit to be not greater than the upper limit of the range described above, it is possible to improve adhesion of the functional layer in electrolysis solution and high-temperature cycle characteristics of secondary batteries.

The core polymer may contain an acid group-containing monomer unit. Examples of acid group-containing monomers include monomers having an acid group, such as carboxyl group-containing monomers, sulfonate group-containing monomers, phosphate group-containing monomers, and hydroxyl group-containing monomers.

Examples of the carboxylic acid group-containing monomers include monocarboxylic acids and dicarboxylic acids. Examples of the monocarboxylic acids include acrylic acid, methacrylic acid, and crotonic acid.

Examples of the dicarboxylic acids include maleic acid, fumaric acid, and itaconic acid.

Examples of the sulfonate group-containing monomers include vinyl sulfonic acid, methylvinyl sulfonic acid, (meth)allyl sulfonic acid, (meth)acrylic acid-2-ethyl sulfonate, 2-acrylamide-2-methyl propane sulfonic acid, and 3-allyloxy-2-hydroxypropane sulfonic acid.

Examples of the phosphate group-containing monomers include 2-(meth)acryloyloxyethyl phosphate, methyl-2-(meth)acryloyloxyethyl phosphate, and ethyl-(meth) acryloyloxyethyl phosphate. As used herein, "(meth)acryloyl" refers to acryloyl and/or methacryloyl.

Examples of the hydroxyl group-containing monomers include 2-hydroxyethyl acrylate, 2-hydroxypropyl acrylate, 2-hydroxyethyl methacrylate, and 2-hydroxypropyl methacrylate.

Of these acid group-containing monomers, carboxylic acid group-containing monomers are preferred, with monocarboxylic acids being more preferred, and (meth)acrylic acid being even more preferred.

These acid group-containing monomers may be used alone or in combination at any ratio.

The percentage of the acid group-containing monomer unit in the core polymer is preferably 1% by mass or more, more preferably 5% by mass or more, even more preferably 10% by mass or more, and preferably 45% by mass or less, more preferably 35% by mass or less, even more preferably 25% by mass or less. By setting the percentage of the acid group-containing monomer unit to fall within the range described above, it is possible to increase dispersibility of the core polymer during preparation of organic particles, enabling a shell that partially covers the core outer surface to be easily formed on the outer surface of the polymer.

The core polymer preferably contains a cross-linkable monomer unit in addition to the monomer units described above. A cross-linkable monomer refers to a monomer that may form a cross-linked structure during or after polymerization by heating or by irradiation with energy beams. When the core polymer contains a cross-linkable monomer unit, the degree of swelling of the core polymer can be easily set to fall within the range described above.

Examples of the cross-linkable monomers include multi-functional monomers having two or more polymerizable groups in the monomer. Examples of such multi-functional monomers include divinyl compounds such as divinyl benzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylol propane trimethacrylate, and trimethylol propane triacrylate; and epoxy group-containing ethylenically unsaturated monomers such as allyl glycidyl ether, and glycidyl methacrylate. Of these monomers, from the perspective of easy control of the degree of swelling in electrolysis solution of the core polymer, ethylene glycol dimethacrylate, allyl glycidyl ether and glycidyl methacrylate are preferred, with ethylene glycol dimethacrylate being more preferred. These cross-linkable monomers may be used alone or in combination at any ratio.

In general, the degree of swelling in electrolysis solution of a polymer tends to decrease with increasing percentage of a cross-linkable monomer unit in that polymer. Accordingly, it is preferable to determine the percentage of a cross-linkable monomer unit in consideration of the type and amount of monomers used. The specific percentage of the cross-linkable monomer unit in the core polymer is preferably 0.1% by mass or more, more preferably 0.2% by mass or more, even more preferably 0.5% by mass or more, particularly preferably 1.0% by mass or more, and preferably 5% by mass or less, more preferably 4% by mass or less, even more preferably 3% by mass or less, and particularly preferably 2% by mass or less. By setting the percentage of the cross-linkable monomer unit to be not less than the lower limit of the range described above, it is possible to improve adhesion of the functional layer in electrolysis solution and cycle characteristic of secondary battery. By setting the percentage of the cross-linkable monomer unit to be not greater than the upper limit of the range described above, it is possible to ensure polymerization stability upon preparation of organic particles so that the resulting organic particles have suitable particulate form.

The core diameter can be measured as a volume-average particle diameter D50 of a particulate polymer prior to shell formation, which is obtained in the production process of organic particles. Such a particulate polymer prior to shell formation corresponds to a polymer constituting the core. The volume-average particle diameter D50 of the particulate polymer prior to shell formation may be measured similarly to that of the organic particles described above.

[[Shell]]
—Degree of Swelling in Electrolysis Solution of Shell Polymer—

The shell of the organic particle having the specific core-shell structure is preferably made of polymer having a specific degree of swelling in electrolysis solution which is smaller than that of the core. Specifically, the shell polymer preferably has a degree of swelling in electrolysis solution of greater than 1 time, more preferably 1.1 times or more, even more preferably 1.2 times or more, and preferably 4 times or less, preferably 3.5 times or less, even more preferably 3 times or less, particularly preferably 1.5 times or less. By setting the degree of swelling in electrolysis solution of the shell polymer to fall within the range described above, it is possible to increase adhesion of the functional layer in electrolysis solution to limit reductions in high-temperature cycle characteristics of secondary batteries.

—Glass-Transition Temperature of Shell Polymer—

The shell polymer preferably has a glass-transition temperature of 50° C. or above, more preferably 60° C. or above, even more preferably 70° C. or above, particularly preferably 80° C. or above, and preferably 200° C. or below, more preferably 180° C. or below, even more preferably 150° C. or below, particularly preferably 120° C. or below. By setting the glass-transition temperature of the shell polymer to be not less than the lower limit of the range described above, it is possible to increase anti-blocking property of the functional layer. By setting the glass-transition temperature of the shell polymer to be not greater than the upper limit of the range described above, it is possible to increase adhesion of the functional layer in electrolysis solution.

—Core-Shell Ratio—

Further, the shell preferably has an average thickness that falls within a specific range with respect to volume-average particle diameter D50 of organic particles. Specifically, the ratio of average shell thickness to volume-average particle diameter D50 of organic particles (core-shell ratio) is preferably 1% or more, more preferably 3% or more, even more preferably 5% or more, particularly preferably 8% or more, and preferably 30% or less, more preferably 25% or less, even more preferably 20% or less, particularly preferably 15% or less. By setting the average shell thickness to be not less than the lower limit of the range described above, it is possible to increase adhesion of the functional layer in electrolysis solution. By setting the average shell thickness to be not greater than the upper limit of the range described above, it is possible to improve low-temperature output characteristics of secondary batteries.

The average shell thickness can be obtained by the observation of cross-sectional structures of organic particles by transmission electron microscopy (TEM). Specifically, the maximum shell thickness in a cross-sectional structure of an organic particle is measured by TEM. 20 or more randomly-selected organic particles are measured for their maximum shell thickness, and an average of the measured maximum thicknesses is recorded as an average shell thickness. However, in the case that the shell is composed of polymer particles and these polymer particles are arranged in a monolayer without being stacked on top of one another in the radial direction of the organic particle, the number-average particle diameter of the polymer particles is recorded as an average shell thickness.

—Form of Shell—

Although the shell may take any form, it is preferably composed of polymer particles. When the shell is composed of polymer particles, these shell particles may be stacked on top of one another in the radial direction of the organic particle. However, shell particles are preferably arranged in a monolayer to constitute a shell without being stacked on top of one another in the radial direction of the organic particle.

When the shell is composed of polymer particles, these shell particles preferably have a number-average particle diameter of 10 nm or more, more preferably 20 nm or more, even more preferably 30 nm or more, and preferably 200 nm or less, more preferably 150 nm or less, and even more preferably 100 nm or less. By setting the number-average particle diameter to fall within the range described above, it is possible to increase adhesion of the functional layer in electrolysis solution.

The number-average particle diameter of shell particles can be obtained by the observation of cross-sectional structures of organic particles by transmission electron microscopy (TEM). Specifically, the maximum diameter of shell particles in a cross-sectional structure of an organic particle is measured, and an average of the maximum shell particle diameters for 20 or more randomly-selected organic particles is recorded as a number-average particle diameter of shell particles.

—Composition of Shell Polymer—

Monomers used for the preparation of the shell polymer are appropriately selected from aliphatic conjugated diene monomers which may form the above-described aliphatic conjugated diene monomer unit and may also be selected from monomers that allow the resulting shell polymer to have a desired degree of swelling in electrolysis solution with the proviso that the percentage of the above-described aliphatic conjugated diene monomer unit in the organic particles becomes 5% by mass or more. Examples of such monomers include those exemplified as monomers which may be used for the production of the core polymer. These monomers may be used alone or in combination at any ratio.

Of these monomers used for the preparation of the shell polymer, aromatic vinyl monomers are preferred. Specifically, the shell polymer preferably contains an aromatic vinyl monomer unit. The use of aromatic vinyl monomers makes it easy to regulate the degree of swelling in electrolysis solution of the shell polymer. Further, it is possible to enhance adhesion of the functional layer. Of aromatic vinyl monomers, styrene and styrene derivatives such as styrene sulfonic acid are more preferred, with styrene being even more preferred from the perspective of further improving low-temperature output characteristics of secondary batteries.

The percentage of the aromatic vinyl monomer unit in the shell polymer is preferably 50% by mass or more, more preferably 60% by mass or more, even more preferably 70% by mass or more, and preferably 99.5% by mass or less, more preferably 99% by mass or less, even more preferably 98% by mass or less, particularly preferably 95% by mass or less. By setting the percentage of the aromatic vinyl monomer unit to fall within the range described above, it is possible to increase adhesion of the functional layer in electrolysis solution to further improve high-temperature cycle characteristics of secondary batteries.

The shell polymer may contain an acid group-containing monomer unit, other than the aromatic vinyl monomer unit. Examples of acid group-containing monomers include monomers similar to monomers that constitute acid group-containing monomer units which may be contained in the core polymer.

Of these acid group-containing monomers, carboxylic acid group-containing monomers are preferred, with monocarboxylic acids being more preferred, and (meth)acrylic acid being even more preferred.

These acid group-containing monomers may be used alone or in combination at any ratio.

The percentage of the acid group-containing monomer unit in the shell polymer is preferably 0.1% by mass or more, more preferably 1% by mass or more, even more preferably 3% by mass or more, particularly preferably 5% by mass or more, and preferably 20% by mass or less, more preferably 15% by mass or less, even more preferably 8% by mass or less. By setting the percentage of the acid group-containing monomer unit to fall within the range described above, it is possible to improve dispersibility of the organic particles in the functional layer allowing good adhesion to be exerted over the entire surface of the functional layer, particularly in electrolysis solution.

The shell polymer may contain a cross-linkable monomer unit. Examples of cross-linkable monomers include monomers similar to those exemplified above as cross-linkable monomers which may be used for the production of the core polymer. These cross-linkable monomers may be used alone or in combination at any ratio.

[[Method of Producing Organic Particles having Core-Shell Structure]]

Organic particles having the specific core-shell structure described above can be produced for example by stepwise polymerization of monomers for core and shell polymers with the ratios of these monomers being changed over time. Specifically, the organic particles can be produced by continuous, multi-stage emulsion polymerization and multi-stage suspension polymerization wherein, e.g., a polymer produced in a previous stage is sequentially covered with a polymer produced in a later stage. In the production of organic particles having the specific core-shell structure, monomers should be used such that aliphatic conjugated diene monomers make up 5% by mass or more of total monomers used for the preparation of core and shell polymers.

By way of example, the following describes an exemplary case where organic particles having the specific core-shell structure described above are obtained by multi-stage emulsion polymerization.

For polymerization, as emulsifiers, anionic surfactants such as sodium dodecylbenzene sulfonate and sodium dodecyl sulfonate; nonionic surfactants such as polyoxyethylene nonylphenyl ether and sorbitan monolaurate; or cationic surfactants such as octadecylamine acetate can be used in accordance with a common procedure. As polymerization initiators, peroxides such as t-butyl peroxy-2-ethylhexanoate, potassium persulfate and cumene peroxide; or azo compounds such as 2,2'-azobis(2-methyl-N-(2-hydroxyethyl)-propionamide), and 2,2'-azobis(2-amidinopropane) hydrochloride can be used.

The polymerization procedure is as follows: A monomer for core and an emulsifier are first mixed into a polymerization solvent such as water, followed by addition of a polymerization initiator to effect batch emulsion polymerization of the monomer to yield a particulate core polymer. Polymerization of a monomer for shell is then effected in the presence of this particulate core polymer to afford organic particles having the core-shell structure described above.

At this time, from the perspective of achieving partial shell coverage on the core outer surface, the monomer for shell polymer is preferably supplied to the polymerization system either multiples times in divided portions or continuously. By supplying the monomer for shell polymer to the polymerization system either multiple times in divided portions or continuously, a shell polymer is produced in particulate form and this particle binds to a core. In this way, a shell that partially covers a core can be formed.

When the monomer for shell polymer is supplied multiple times in divided portions, it is possible to control the particle diameters of shell particles and the average shell thickness according to the number of divided portions. When the monomer for shell polymer is supplied continuously, it is possible to control the particle diameters of shell particles and the average shell thickness by adjusting the amount of the monomer supplied per unit time.

When a monomer that has a low affinity for polymerization solvent is used as the monomer for the shell polymer, a shell that partially covers a core tends to be easily formed. When water is used as a polymerization solvent, the monomers for the shell polymer thus preferably include a hydrophobic monomer, particularly preferably an aromatic vinyl monomer.

Further, when smaller amounts of emulsifier are used for the polymerization of the monomer for shell, a shell that partially covers a core tends to be easily formed. Thus, a shell that partially covers a core can be formed also by appropriately adjusting the amount of emulsifier.

The volume-average particle diameter of the particulate core polymer, volume-average particle diameter D50 of organic particles after shell formation, and number-average particle diameter of shell particles can be set to fall within their desired ranges for example by the adjustment of the amounts of emulsifier and monomers, for example. Further, the degree of swelling in electrolysis solution of whole organic particles can be set to fall within a desired range by adjusting the compositions of core and shell polymers.

Further, the average ratio of shell coverage on the core outer surface can be set to fall within a desired range for example by the adjustment of the amount of emulsifier and the amount of the monomer for the shell polymer correspondingly with the volume-average particle diameter of the particulate core polymer.

<Particulate Polymer for Functional Layer>

From the perspective of preventing components of the functional layer from coming off the functional layer prior to immersion into electrolysis solution, it is preferred to add as a binder a particulate polymer for functional layer in the functional layer composition.

In particular, when the organic particles have the specific core-shell structure and the specific degree of swelling in electrolysis solution described above, they do not exert high adhesion when not swollen in electrolysis solution. Accordingly, it is preferred to add a particulate polymer for functional layer, particularly one that exerts higher adhesion than the organic particles in a 25° C. environment where the particulate polymer is not swollen in electrolysis solution, to the functional layer composition.

Examples of particulate polymers for functional layer which may be used in combination with the organic particles include water-insoluble, water-dispersible particulate polymers known in the art which may be used as binders in the field of secondary batteries, e.g., thermoplastic elastomers. Of thermoplastic elastomoers, acrylic polymers are preferred.

Acrylic polymers refer to polymers containing a (meth) acrylic acid ester monomer unit. The percentage of the aliphatic conjugated diene monomer unit contained in the acrylic polymer is preferably 5% by mass or less, more preferably less than 5% by mass.

These particulate polymers for functional layer may be used alone or in combination.

The particulate polymer for functional layer preferably has a glass-transition temperature of −100° C. or above, more preferably −80° C. or above, even more preferably −70° C. or above, and preferably 30° C. or below, more preferably 25° C. or below, even more preferably 20° C. or below. By setting the glass-transition temperature of the particulate polymer for functional layer to be not less than the lower limit of the range described above, it is possible to increase adhesion of the functional layer. By setting the glass-transition temperature of the particulate polymer for functional layer to be not greater than the upper limit of the range described above, it is possible to increase flexibility of the functional layer.

The particulate polymer for functional layer preferably has a volume-average particle diameter D50 of 100 nm or more, more preferably 200 nm or more, and preferably 500 nm or less, more preferably 400 nm or less. By setting the volume-average particle diameter D50 of the particulate polymer for functional layer to be not less than the lower limit of the range described above, it is possible to increase dispersibility of the particulate polymer for functional layer. By setting the volume-average particle diameter D50 to be not greater than the upper limit of the range described above, it is possible to increase adhesion of the particulate polymer for functional layer. The volume-average particle diameter D50 of the particulate polymer for functional layer may be measured similarly to the volume-average particle diameter D50 of the organic particles.

The amount of the particulate polymer for functional layer in the functional layer composition is preferably 0.1 parts by mass or more, more preferably 1 part by mass or more, even more preferably 10 parts by mass or more, and preferably 35 parts by mass or less, more preferably 30 parts by mass or less, even more preferably 25 parts by mass or less, per 100 parts by mass of the organic particles. By setting the amount of the particulate polymer for functional layer to be not less than the lower limit of the range described above, it is possible to sufficiently prevent fall of the organic particles from the functional layer and to increase adhesion of the functional layer. By setting the amount of the particulate polymer for functional layer to be not greater than the upper limit of the range described above, it is possible to limit reductions in ion diffusivity of the functional layer to ensure low-temperature output characteristics of secondary batteries.

Examples of methods of producing the particulate polymer for functional layer include solution polymerization, suspension polymerization, and emulsion polymerization. Of these polymerization methods, preferred are emulsion polymerization and suspension polymerization because polymerization can be effected in water and therefore a water dispersion containing a particulate polymer can be suitably directly used as a material for the functional layer composition. Upon production of a particulate polymer for functional layer, the reaction system preferably contains a dispersant. In general, the particulate polymer for functional layer is substantially formed of a polymer that constitutes that particulate polymer. However, the particulate polymer may also have optional component(s) such as additives which were used for polymerization.

<Non-Conductive Particles>

Any type of non-conductive particles can be blended into the functional layer composition used for forming a functional layer that may function as a porous membrane layer. Examples thereof include non-conductive particles known in the art used for non-aqueous secondary batteries.

Specifically, both inorganic and organic microparticles other than the organic particles and the particulate polymers for functional layer described above can be used as non-conductive particles. However, inorganic microparticles are normally used. Among materials of non-conductive particles, such materials are preferred that are present stably in the use environment of non-aqueous secondary batteries and have electrochemical stability. Preferred examples of materials of non-conductive particles from such a perspective include particles of oxides such as aluminum oxide (alumina), hydrated aluminum oxide (boehmite), silicon oxide, magnesium oxide (magnesia), calcium oxide, titanium oxide (titania), $BaTiO_3$, ZrO, and alumina-silica composite oxide; particles of nitrides such as aluminum nitride and boron nitride; particles of covalent crystals such as silicon and diamond; particles of hardly-soluble ionic crystals such as barium sulfate, calcium fluoride and barium fluoride; and microparticles of clays such as talc and montmorillonite. These particles may be subjected to element replacement, surface treatment, solid solution treatment and/or the like where necessary.

The non-conductive particles may be used alone or in combination. In the present disclosure, however, from the perspective of increasing the transition metal trapping ability and adhesion of a functional layer obtained using the composition for non-aqueous secondary battery functional layer, it is required to set the amount of non-conductive particles in the composition to 50% by mass or less in terms of solid content even when using the functional layer as a porous membrane layer.

<Additional Components>

The composition for non-aqueous secondary battery functional layer may contain optional additional component(s) in addition to the organic particles, particulate polymer for functional layer and non-conductive particles described above. Examples of additional components include additives known in the art, such as wetting agents, viscosity modifiers, and additives for electrolysis solution. In particular, from the perspective of forming a uniform functional layer, the composition for non-aqueous secondary battery functional layer preferably contains wetting agents. These additional components may be used alone or in combination.

[Wetting Agent]

It is preferred to use nonionic or anionic surfactants as wetting agents. The amount of the wetting agent is preferably 0.1 parts by mass or more, more preferably 0.3 parts by mass or more, even more preferably 0.5 parts by mass or more, particularly preferably 1.5 parts by mass or more, and preferably 3 parts by mass or less, more preferably 2.5 parts by mass or less, even more preferably 2 parts by mass or less, per 100 parts by mass of the organic particles.

<Method of Preparing Composition for Non-Aqueous Secondary Battery Functional Layer>

The composition for non-aqueous secondary battery functional layer can be prepared by dissolving or dispersing the components described above in hydrophilic solvent such as water. Specifically, the functional layer composition can be prepared by mixing the components described and hydrophilic solvent using a mixer such as ball mill, sand mill, bead mill, pigment disperser, grinding machine, ultrasonic disperser, homogenizer, planetary mixer, or FILMIX.

[Hydrophilic Solvent]

Examples of hydrophilic solvents include water; ketones such as diacetone alcohol and γ-butyrolactone; alcohols such as ethyl alcohol, isopropyl alcohol, and normal propyl alcohol; glycol ethers such as propylene glycol monomethyl ether, methyl cellosolve, ethyl cellosolve, ethylene glycol tert-butyl ether, butyl cellosolve, 3-methoxy-3-methyl-1-butanol, ethylene glycol monopropyl ether, diethylene glycol monobutyl ether, triethylene glycol monobutyl ether, and dipropylene glycol monomethyl ether; and ethers such as 1,3-dioxolane, 1,4-dioxolane, and tetrahydrofuran. It may be possible to use water as the main solvent, with the hydrophilic solvent(s) described above other than water being mixed within an extent that can ensure that the components described above remain dissolved or dispersed therein.

(Functional Layer for Non-Aqueous Secondary Battery)

The disclosed functional layer for non-aqueous secondary battery is formed using the composition for non-aqueous secondary battery functional layer described above. The disclosed functional layer for non-aqueous secondary battery is then used as an adhesive layer and/or a porous membrane layer when manufacturing the disclosed non-aqueous secondary battery.

Specifically, the functional layer for non-aqueous secondary battery can be formed on a proper substrate using the composition for non-aqueous secondary battery functional layer described above. The functional layer may be provided on one or both sides of the substrate. Alternatively, the functional layer may be peeled from the substrate for direct use as a separator as a self-supporting film.

The disclosed functional layer for non-aqueous secondary battery can exert a high ability of transition metal trapping while ensuring high adhesion.

<Substrate>

Any substrate can be used for forming a functional layer thereon. A separator substrate can be used when the functional layer is used as a member that constitutes part of a separator. Moreover, an electrode substrate can be used when the functional layer is used as a member that constitutes part of an electrode. The functional layer formed on the substrate can be used in any way. For example, the functional layer may be formed on a separator substrate or the like to form a battery member such as a separator; the functional layer may be formed on an electrode substrate to form an electrode; or the functional layer formed on a releasable substrate may be peeled and then attached to another substrate to form a battery member. Because 50% by mass or more of the disclosed functional layer for non-aqueous secondary battery is made up of the organic particles described above, from the perspective of sufficiently increasing strength and heat resistance of a battery member, the functional layer may be formed on a separator substrate or electrode substrate on which a known porous membrane layer (protection layer) has been formed which contains at least 70% by mass of non-conductive particles such as those described above.

[Separator Substrate]

Any separator substrate can be used as a substrate on which a functional layer is to be formed. Examples thereof include known separator substrates such as organic separators. The organic separator is a porous member made of organic material. Examples of organic separators include fine porous membranes and non-woven fabrics containing polyolefin resins such as polyethylene or polypropylene or aromatic polyamide resins. In particular, fine porous membranes and non-woven fabrics made of polyethylene are preferred because of superior strength. The organic separator can have any thickness and typically has a thickness of 0.5 μm or more, preferably 5 μm or more, and typically 40 μm or less, preferably 30 μm or less, more preferably 20 μm or less.

[Electrode Substrate]

Any electrode substrate can be used as a substrate on which a functional layer is to be formed. Examples include electrode substrates that include an electrode mixed material layer formed on a current collector.

The current collector, electrode mixed material layer components (e.g., electrode active materials (i.e., positive and negative electrode active materials) and binders for electrode mixed material layer (i.e., binders for positive and negative electrode mixed material layers)) and method of forming an electrode mixed material layer on a current collector can be selected from those known in the art; for example, those described in JP2013-145763A can be used.

In particular, from the perspective of increasing battery capacity, as the positive electrode active material, when the non-aqueous secondary battery is a lithium ion secondary battery, transition metal-containing compounds such as transition metal oxides, transition metal sulfides, and composite metal oxides of lithium and transition metal are used. Examples of transition metals include Ti, V, Cr, Mn, Fe, Co, Ni, Cu, and Mo.

Examples of the transition metal oxides include MnO, $MnO_2$, $V_2O_5$, $V_6O_{13}$, $TiO_2$, $Cu_2V_2O_3$, amorphous $V_2O$—$P_2O_5$, amorphous $MoO_3$, amorphous $V_2O_5$, and amorphous $V_6O_{13}$.

Examples of the transition metal sulfides include $TiS_2$, $TiS_3$, amorphous $MoS_2$, and FeS.

Examples of the composite metal oxides of lithium and transition metal include lithium-containing composite metal oxides having layered structure, lithium-containing composite metal oxides having spinel structure, and lithium-containing composite metal oxides having olivine structure.

Examples of the lithium-containing composite metal oxides having layered structure include lithium-containing cobalt oxide ($LiCoO_2$), lithium-containing nickel oxide ($LiNiO_2$), lithium-containing composite oxide of Co—Ni—Mn ($Li(CoMnNi)O_2$), lithium-containing composite oxide of Ni—Co—Al, and solid solution of $LiMaO_2$ and $Li_2MbO_3$.

Examples of the lithium-containing composite metal oxides having spinel structure include lithium manganese oxide ($LiMn_2O_4$), and compounds in which part of Mn in lithium manganese oxide ($LiMn_2O_4$) is replaced by one or more other transition metals.

Examples of the lithium-containing composite metal oxides having olivine structure include olivine-type lithium phosphate compounds represented by $Li_yMdPO_4$, such as olivine-type lithium iron phosphate ($LiFePO_4$) and olivine-type lithium manganese phosphate ($LiMnPO_4$), where Md represents one or more transition metals having an average oxidation state of 3+, such as Mn, Fe and Co, and y represents a number satisfying the condition $0 \leq y \leq 2$. Further, in the olivine-type lithium phosphate compound represented by $Li_yMdPO_4$, part of Md may be replaced by one or more other metals. Examples of possible replacing metals include Cu, Mg, Zn, V, Ca, Sr, Ba, Ti, Al, Si, B and Mo.

Of these compounds, from the perspective of increasing the capacity of non-aqueous secondary battery as well as from the perspective of output characteristics and high-temperature cycle characteristics of non-aqueous secondary batteries, preferred are composite metal oxides of lithium and transition metal among which lithium-containing composite metal oxides having layered structure are preferred, with lithium-containing cobalt oxides ($LiCoO_2$) being more preferred.

[Releasable Substrate]

Any releasable substrate known in the art can be used as a substrate on which a function layer is to be formed.

<Method of Forming Functional Layer for Non-Aqueous Secondary Battery>

Examples of methods of forming a functional layer on the substrate described above such as a separator substrate or electrode substrate include:

1) applying the functional layer composition on the surface of a separator substrate or electrode substrate and drying the composition;

2) immersing a separator substrate or electrode substrate into the functional layer composition and drying the composition; and 3) applying the functional layer composition on a releasable substrate, drying the composition to form a functional layer, and transferring the resulting functional layer to the surface of a separator substrate or electrode substrate.

Any method known in the art can be used to apply the functional layer composition on a separator substrate or electrode substrate. Specific examples include spray coating, doctor blading, reverse roll coating, direct roll coating, gravure coating, extrusion coating, and brush coating. The thickness of the coating film on the substrate after coating and before drying can be appropriately determined depending on the thickness of the functional layer obtained by drying. The functional layer composition applied on the substrate can be dried by any method known in the art, e.g., drying by warm, hot, or low-humidity air; vacuum drying; or drying by irradiation with infrared light or electron beams.

After drying of the functional layer composition, the resulting functional layer may be subjected to press treatment using a mold press, a roll press or the like. By press treatment, it is possible to increase adhesion between the functional layer and substrate.

Thus, the functional layer contains the same components as the functional layer composition except for the dispersing medium contained therein at the same ratios as the functional layer composition, and typically contains the organic particles and optionally contains additional components such as particulate polymers for functional layer, non-conductive particles, wetting agents and dispersing agents.

[Thickness of Functional Layer]

The thickness of the functional layer is preferably 0.3 µm or more, more preferably 0.5 µm or more, even more preferably 0.7 µm or more, and preferably 10 µm or less, more preferably 7 µm or less, even more preferably 5 µm or less. When the thickness of the functional layer is not less than the lower limit of the range described above, it is possible to sufficiently ensure strength of the functional layer and to more sufficiently trap transition metals derived from the positive electrode active material to improve battery characteristics of secondary batteries which include the functional layer. When the thickness of the functional layer is not greater than the upper limit of the range described above, it is possible to ensure diffusivity of electrolysis solution and to sufficiently reduce the size of secondary batteries.

(Non-Aqueous Secondary Battery)

The disclosed non-aqueous secondary battery includes the functional layer for non-aqueous secondary battery described above between a positive electrode mixed material layer which contains a transition metal-containing positive electrode active material, and a negative electrode mixed material layer. Specifically, the disclosed non-aqueous secondary battery includes a positive electrode, a negative electrode, a separator, and an electrolysis solution, wherein the functional layer for non-aqueous secondary battery described above is disposed between a positive electrode mixed material layer which contains a transition metal-containing positive electrode active material, and a negative electrode mixed material layer. In the disclosed non-aqueous secondary battery, the disclosed functional layer can effectively trap transition metal ions dissolved into the electrolysis solution from the positive electrode active material to limit deposition of the transition metal ions on the negative electrode. Thus, the disclosed non-aqueous secondary battery exhibits superior life characteristics such as cycle characteristics. Further, in the disclosed non-aqueous secondary battery, the disclosed functional layer exerts superior adhesion, making it possible to increase adhesion between the positive electrode and separator and/or between the negative electrode and separator by means of the functional layer.

<Positive Electrode, Negative Electrode and Separator>

At least one of the positive electrode, negative electrode and separator used in the disclosed non-aqueous secondary battery has a functional layer. Specifically, as positive and negative electrodes having a functional layer, it is possible to use electrodes that include a function layer provided on an electrode substrate which is formed by forming an electrode mixed material layer on a current collector. As a separator having a functional layer, it is possible to use a separator that includes a functional layer provided on a separator substrate, or a separator formed of a functional layer. As the electrode substrate and separator substrate, it is possible to use substrates exemplified in the section titled <Substrate> above.

As a positive electrode, a negative electrode and a separator which do not have a functional layer, it is possible to use electrodes formed of the electrode substrate described above, and a separator formed of the separator substrate described above.

The positive electrode, negative electrode and separator may have component(s) other than the functional layer as long as the disclosed effect is not significantly compromised.

<Electrolysis Solution>

As the electrolysis solution, an organic electrolysis solution obtained by dissolving a supporting electrolyte into an organic solvent is normally used. As the supporting electrolyte, for example, when the non-aqueous secondary battery is a lithium ion secondary battery, lithium salts are used. Examples of lithium salts include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferred in that they easily dissolve in solvent and exhibit a high degree of dissociation. Electrolytes may be used alone or in combination at any ratio. Normally, lithium ion conductivity tends to increase as a supporting electrolyte with a higher degree of dissociation is used. Therefore, lithium ion conductivity can be adjusted by the type of supporting electrolyte.

Any organic solvent that can dissolve the supporting electrolyte can be used as the organic solvent in the electrolysis solution. Preferred examples include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. A mixed solution of these solvents may also be used. Of these solvents, carbonates are preferred for their high dielectric constant and broad stable potential region. Normally, lithium ion conductivity tends to increase with decreasing viscosity of the solvent used. Therefore, lithium ion conductivity can be adjusted by the type of solvent.

The electrolyte concentration of the electrolysis solution can be appropriately adjusted. Any of the additives known in the art, such as vinylene carbonate (VC), may be added to the electrolysis solution.

<Method of Manufacturing Non-Aqueous Secondary Battery>

The disclosed non-aqueous secondary battery may be manufactured for example by stacking a positive electrode and a negative electrode with a separator provided therebetween, winding or folding the resulting laminate as necessary in accordance with the battery shape, placing it in a battery container, filling the battery container with an electrolysis solution, and sealing the container. To prevent an internal pressure rise in the non-aqueous secondary battery and the occurrence of overcharge/overdischarge, an overcurrent preventing device such as a fuse or a PTC device; expanded metal; a lead plate; and so forth may be placed in the battery where necessary. The secondary battery may be of any shape, such as coin, button, sheet, cylindrical, square or flat shape.

EXAMPLES

Hereinafter, the present disclosure will be specifically described with reference to Examples; however, the disclosure is not limited to the Examples. In the following, "%" and "parts" used in expressing quantities are by mass, unless otherwise specified.

In a polymer produced by copolymerization of more than one monomer, the percentage of a structural unit formed by polymerization of a monomer in the polymer is consistent with the proportion (blending ratio) of the monomer in the total monomers used for the polymerization of the polymer, unless otherwise indicated.

In Examples and Comparative Examples, the following properties were measured and evaluated by the methods described below: degrees of swelling in electrolysis solution of core polymer, shell polymer and organic particles; glass-transition temperatures of core, shell, and particulate polymer for functional layer; core-shell ratio of organic particles; ratio of coverage of organic particles; volume-average particle diameters D50 of organic particles and particulate polymer for functional layer; adhesion of the functional layer in electrolysis solution; low-temperature output characteristics of secondary batteries; high-temperature cycle characteristics of secondary batteries; and transition metal trapping ability of the functional layer.

<Degree of Swelling in Electrolysis Solution of Core Polymer>

As a core polymer of organic particles, first, a polymer was provided which was obtained by a process similar to that used for forming the core of organic particles. The polymer was dried at 25° C. for 48 hours and then shaped into a 0.5 mm thick film by heat press at 130° C.

Next, the film prepared as described above is cut into a 1 cm×1 cm square sheet to provide a test specimen. The weight (W0) of the test specimen was measured. Further, the test specimen was immersed into electrolysis solution at 60° C. for 72 hours and taken out from the electrolysis solution. The electrolysis solution on the surface of the test specimen was wiped off, and the weight (W1) of the test specimen after immersion was measured.

Using weights W0 and W1, the degree of swelling S (fold) in electrolysis solution was calculated based on the equation S=W1/W0.

The electrolysis solution was prepared by dissolving supporting electrolyte $LiPF_6$ into a mixture solvent of ethylene carbonate (EC), diethyl carbonate (DEC) and vinylene carbonate (VC) (mixing ratio: EC/DEC/VC=68.5/30/1.5 (by volume), SP value: 12.7 $(cal/cm^3)^{1/2}$) at a concentration of 1 mol/L.

<Degree of Swelling in Electrolysis Solution of Shell Polymer>

First, as a shell polymer of organic particles, a polymer was produced similarly to the shell using a monomer composition for shell instead of a monomer composition for core used upon preparation of organic particles.

As with the measurement method of the degree of swelling in electrolysis solution of the core polymer, a film was manufactured using the shell polymer, a test specimen was obtained from the film, and the degree of swelling in electrolysis solution (S) was measured.

The electrolysis solution used for the measurement of the degree of swelling in electrolysis solution of the shell polymer was similar to the electrolysis solution used for the measurement of the degree of swelling in electrolysis solution of the core polymer.

<Degree of Swelling in Electrolysis Solution of Organic Particles>

First, organic particles were provided. As with the measurement method of the degree of swelling in electrolysis solution of the core polymer, a film was manufactured using the organic particles, a test specimen was obtained from the film, and the degree of swelling in electrolysis solution (S) was measured.

The electrolysis solution used for the measurement of the degree of swelling in electrolysis solution of the organic particles was similar to the electrolysis solution used for the measurement of the degree of swelling in electrolysis solution of the core polymer.

<Glass-transition Temperatures of Organic Particles, Core Polymer, Shell Polymer and Particulate Polymer for Functional Layer>

For the measurement of the glass-transition temperatures of organic particles, core and shell polymers, monomer compositions used for the preparation of these polymers were used to prepare water dispersions of polymers as measurement specimens under the polymerization conditions similar to those used for the polymers, and the water dispersions were dried to solid to prepare test specimens.

For the measurement of the glass-transition temperature of the particulate polymer for functional layer, a test specimen was used which was obtained by drying a water dispersion containing the resulting particulate polymer for functional layer to solid.

Measurement of the glass-transition temperatures was conducted as follows: A DSC curve was measured on a differential scanning calorimeter ("EXSTAR DSC6220" from SII NanoTechnology Inc.) at normal temperature and normal humidity in the measurement temperature range of −100° C. to 500° C. at a heating rate of 10° C./min, where 10 mg of the measurement specimen was weighed into an aluminum pan, and an empty aluminum pan was used as a reference. The glass-transition temperature was determined from the point of intersection of the baseline immediately before appearance of an endothermic peak in the DSC curve where the differential signal (DDSC) reaches 0.05 mW/min/mg or higher with the tangent to the DSC curve at the inflection point that appears first after the endothermic peak, in this heating step.

<Core-Shell Ratio of Organic Particle>

Prepared organic particles were fully dispersed in visible light-curable epoxy resin ("D-800" from JEOL Ltd.) and then embedded to form a block piece containing the organic particles. A thin slice of 100 nm thickness was then cut from the block piece using a microtome equipped with a diamond blade to prepare a measurement specimen. Thereafter, the measurement specimen was subjected to dying treatment using ruthenium tetroxide.

The dyed measurement specimen was then loaded into a transmission electron microscope ("JEM-3100F" from JEOL Ltd.), and an image of a cross-sectional structure of an organic particle was captured at an acceleration voltage of 80 kV. The magnification of the electron microscope was set such that a cross-section of one organic particle was within the field of view. The cross-sectional structure of the imaged organic particle was observed and the average shell thickness of the organic particles was measured in the manners described below according to the observed shell structure. The core-shell ratio (%) was then calculated by dividing the measured average shell thickness by the volume-average particle diameter D50 of the organic particles.

[When the Shell has Particulate Form]

From the cross-sectional structure of the organic particle observed, the maximum diameter of shell polymer particles was measured. 20 randomly-selected organic particles were measured for their maximum diameter of shell polymer particles, and an average of the maximum diameters was recorded as an average shell thickness.

[When the Shell has Shape other than Particulate Shape]

From the cross-sectional structure of the organic particle observed, the maximum shell thickness was measured. 20 randomly-selected organic particles were measured for their maximum shell thickness, and an average of the maximum shell thicknesses was recorded as an average shell thickness <Ratio of Coverage of Organic Particles>

As with the measurement method of the core-shell ratio of the organic particle, an image of a cross-sectional structure of a prepared organic particle was captured. In the cross-sectional structure of the captured organic particle, length D1 (circumferential length of the core) and length D2 (length of a part where the core outer surface contacts the shell) were measured, and the ratio of shell coverage on the core outer surface of that organic particle (Rc) was calculated using the following Equation (1): Ratio of coverage Rc (%)=(D2/D1)×100

The ratio of coverage (Rc) was measured for 20 randomly-selected organic particles, and an average was calculated. The calculated average was recorded as an average ratio of shell coverage on the core outer surface (ratio of coverage).

<Volume-Average Particle Diameters D50 of Organic Particles and Particulate Polymer for Functional Layer>

For the prepared organic particles and particulate polymer for functional layer, water dispersions adjusted to have a solid content concentration of 15% by mass were prepared, and particle size distributions were measured by a laser diffraction particle size analyzer ("SALD-7100" from Shimadzu Corporation). In each particle size distribution obtained, the particle diameter where the cumulative volume from the fine side amounts to 50% of the entire volume in the particle size distribution was found and recorded as a volume-average particle diameters D50.

<Adhesion of Functional Layer in Electrolysis Solution>

A manufactured laminate having a positive electrode and a separator and a manufactured laminate having a negative electrode and a separator were each cut into a 10 mm-width piece to prepare a test specimen. Each test specimen was immersed in electrolysis solution for 3 days at 60° C. The electrolysis solution was prepared by dissolving supporting electrolyte $LiPF_6$ into a mixture solvent of ethylene carbonate (EC), diethyl carbonate (DEC) and vinylene carbonate (VC) (mixing ratio: EC/DEC/VC=68.5/30/1.5 (by volume), SP value: 12.7 $(cal/cm^3)^{1/2}$) at a concentration of 1 mol/L.

The test specimen was then taken out from the electrolysis solution and the electrolysis solution on the surface of the test specimen was wiped off. An adhesive cellophane tape was then attached to the surface of the electrode (positive or negative electrode) of the test specimen with the surface of the electrode facing down. An adhesive cellophane tape specified in JIS Z1522 was used. The adhesive cellophane tape had been affixed on a horizontal test stage beforehand. Subsequently, the stress at the time when the separator was peeled by pulling up one end in the vertical direction at a pulling rate of 50 mm/min was measured. The measurement was made for a total of 6 times, 3 times for the laminate having a positive electrode and a separator and 3 times for the laminate having a negative electrode and a separator. An average of the measured stress values was recorded as peel strength (N/m) which was evaluated based on the criteria below. A greater value of peel strength indicates superior adhesion of the functional layer in the electrolysis solution.

A: peel strength is 5.0 N/m or greater
B: peel strength is 3.0 N/m or greater to less than 5.0 N/m
C: peel strength is 0.5 N/m or greater to less than 3.0 N/m
D: peel strength is less than 0.5 N/m <Low-Temperature Output Characteristics of Secondary Battery>

A manufactured spirally wound lithium ion secondary battery with a capacity of 800 mAh was allowed to stand for 24 hours in the environment of 25° C., and then charged at 0.1 C for 5 hours in the environment of 25° C. Voltage V0 at that time was measured. The lithium ion secondary battery was discharged at 1 C in the environment of −10° C., and a voltage measured 15 seconds after the initiation of discharge was recorded as V1.

Voltage change $\Delta V$ (=V0−V1) was then calculated and evaluated based on the criteria given below. A smaller voltage change $\Delta V$ indicates superior low-temperature output characteristics of the secondary battery.

A: Voltage change $\Delta V$ is less than 350 mV
B: Voltage change $\Delta V$ is 350 mV or greater to less than 500 mV
C: Voltage change $\Delta V$ is 500 mV or greater <High-Temperature Cycle Characteristics of Secondary Battery>

A manufactured spirally wound lithium laminate cell with a capacity of 800 mAh was subjected to 200 cycles of charging to 4.35V and discharging to 3V by the galvanostatic method at 0.5 C in the environment of 45° C., and a discharge capacity was measured. An average for 5 cells was taken as a measurement value. The percentage of discharge capacity C1 measured after 200 cycles to discharge capacity C0 measured after 3 cycles was calculated to find % capacity maintenance $\Delta C$ (=(C1/C0)×100(%)) for use as evaluation criteria of cycle characteristics. A higher value of $\Delta C$ indicates superior high-temperature cycle characteristics and therefore longer life of the secondary battery.

A: % capacity maintenance $\Delta C$ is 80% or greater
B: % capacity maintenance $\Delta C$ is 70% or greater to less than 80%
C: % capacity maintenance $\Delta C$ is 60% or greater to less than 70%
D: % capacity maintenance $\Delta C$ is less than 60%

<Transition Metal Capturing Ability of Functional Layer>

A prepared composition for non-aqueous secondary battery functional layer (solid content concentration: 15% by mass) was poured onto a Teflon® (Teflon is a registered trademark in Japan, other countries, or both) petri dish and dried for 5 days at 25° C. The dried solid was punched to provide a film of 12 mm diameter and 500 µm thickness as a test specimen, and the mass of the test specimen was measured. Next, an electrolysis solution was prepared by dissolving supporting electrolyte $LiPF_6$ into a mixture solvent of ethylmethyl carbonate and ethylene carbonate (ethylmethyl carbonate:ethylene carbonate=70:30 (by mass)) at a concentration of 1 mol/L, and 10 g of the electrolysis solution was placed into a glass container. The test specimen was immersed into the electrolysis solution and allowed to stand for 24 hours at 25° C. so that the test specimen was fully swollen in the electrolysis solution. Cobalt chloride anhydrous ($CoCl_2$) was dissolved into an electrolysis solution having the same composition as the electrolysis solution prepared above to prepare a cobalt chloride solution having a cobalt concentration of 18 ppm by mass (cobalt chloride concentration of 40 ppm by mass). Next, 10 g of the cobalt chloride solution was placed into the glass container which contains the test specimen swollen with the electrolysis solution so that the test specimen was immersed into the cobalt chloride solution, and the test specimen was allowed to stand for 5 days at 25° C. Subsequently, the test specimen was taken out of the glass container and fully washed with diethyl carbonate. After fully wiping off diethyl carbonate on the test specimen, the weight of the test specimen was measured. The test specimen was then placed into a Teflon beaker and sulfuric acid and nitric acid (sulfuric acid nitric acid=0.1:2 (by volume)) were added to the beaker. The solution with the test specimen was heated on a hot plate and concentrated until the test specimen was carbonized. Further, after adding nitric acid and perchloric acid (nitric acid:perchloric acid=2:0.2 (by volume)), perchloric acid and hydrofluoric acid (perchloric acid:hydrofluoric acid=2:0.2 (by volume)) were added and concentrated until white fume appeared. Next, nitric acid and ultrapure water (nitric acid: ultrapure water=0.5:10 (by volume)) were added and heated. The solution was allowed to stand to cool and the volume was adjusted. The amount of cobalt in the resulting solution was measured with an ICP mass spectrometer (ELAN DRS II, PerkinElmer). The amount of cobalt in the solution was divided by the weight of the test specimen to find a cobalt concentration (ppm by mass) in the test specimen as a measure of transition metal trapping ability which was evaluated based on the criteria given below.

A higher cobalt concentration indicates a higher ability of transition metal trapping per unit mass of the non-aqueous secondary battery functional layer.

A: cobalt concentration in test specimen is 750 ppm by mass or greater
B: cobalt concentration in test specimen is 600 ppm by mass or greater to less than 750 ppm by mass
C: cobalt concentration in test specimen is 450 ppm by mass or greater to less than 600 ppm by mass
D: cobalt concentration in test specimen is less than 450 ppm by mass Example 1

<Production of Organic Particles>

A 5 MPa pressure resistant vessel equipped with a stirrer was charged with, as a monomer composition for core, 35 parts of methyl methacrylate (MMA) as a (meth)acrylic acid alkyl ester monomer, 17 parts of 1,3-butadiene (BD) as an aliphatic conjugated diene monomer, 17 parts of methacrylic acid (MAA) as a carboxylic acid group-containing monomer and 1 part of ethylene dimethacrylate (EDMA) as a crosslinkable monomer; 1 part of sodium dodecylbenzene sulfonate as an emulsifier; 150 parts of ion-exchanged water; and 0.5 parts of potassium persulfate as a polymerization initiator. After fully stirred, the temperature was raised to 60° C. to initiate polymerization. Polymerization was continued until the polymerization conversion rate reached 96%, whereby a water dispersion containing a particulate core polymer was obtained.

To the water dispersion were continuously added, as a monomer composition for shell, 28 parts of styrene (ST) as an aromatic vinyl monomer and 2 parts of methacrylic acid (MAA) as a carboxylic acid group-containing monomer, and the reaction mass was heated to 70° C. to continue polymerization. When the polymerization conversion rate reached 96%, the reaction was quenched by cooling to produce a water dispersion containing organic particles. The organic particles had a core-shell structure having a core and a shell that partially covers the outer surface of the core. The percentage of 1,3-butadiene (BD) as an aliphatic conjugated diene monomer in the monomers used for the preparation of the organic particles was 17% by mass. The degree of swelling in electrolysis solution, core-shell ratio, ratio of coverage, and volume-average particle diameter D50 of the organic particles were measured. The results are given in Table 1.

<Production of Particulate Polymer for Functional Layer>

A reactor equipped with a stirrer was charged with 70 parts of ion-exchanged water, 0.15 parts of sodium lauryl sulfate ("EMAL 2F" from Kao Chemicals) as an emulsifier and 0.5 parts of ammonium persulfate as a polymerization initiator, the gas phase was purged with nitrogen gas, and the temperature was raised to 60° C.

In another vessel, 50 parts of ion-exchanged water, 0.5 parts of sodium dodecylbenzenesulfonate as a dispersant, and 95 parts of butyl acrylate, 2 parts of acrylonitrile, 2 parts of methacrylic acid and 1 part of N-methylol acrylamide as polymerizable monomers were mixed to afford a monomer mixture. The monomer mixture was continuously added to the reactor over 4 hours to effect polymerization. During addition, the temperature was retained at 60° C. for polymerization reaction. After completion of addition, the reaction mass was stirred for a further 3 hours at 70° C. to afford a water dispersion containing a particulate acrylic polymer as a particulate polymer for functional layer.

The resulting particulate polymer for functional layer had a volume-average particle diameter D50 of 0.36 μm and a glass-transition temperature of −30° C.

<Preparation of Composition for Non-Aqueous Secondary Battery Functional Layer>

100 parts in terms of solid content of the water dispersion containing organic particles, 20 parts in terms of solid content of the water dispersion of the acrylic polymer as a particulate polymer for functional layer, 1.8 parts of SN Wet 366 (SAN NOPCO Ltd.; solid content: 70%) as a wetting agent, and ion-exchange water were mixed so that the solid content concentration became 20% to prepare a composition for non-aqueous secondary battery functional layer. The percentage of the organic particles in the solid content of the composition for non-aqueous secondary battery functional layer as measured based on blending amounts was 82.1% by mass.

<Manufacture of Separator>

A polyethylene organic porous substrate (thickness: 16 μm, Gurley number: 210 s/100 cc) was provided as a separator substrate. The functional layer composition in slurry form was applied on both sides of the separator substrate by spray coating and dried for 1 minute at 50° C. In this way a separator was obtained which had a functional layer (adhesive layer) of 1 μm thickness per side on the separator substrate. This separator included a functional layer, a separator substrate, and a functional layer in the order presented.

<Production of Particulate Binder for Negative Electrode>

A 5 MPa pressure-resistant vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzene sulfonate as an emulsifier, 150 parts of ion-exchanged water, and 0.5 parts of potassium persulfate as a polymerization initiator. After fully stirred, the temperature was raised to 50° C. to initiate polymerization. When the polymer conversion rate reached 96%, the reaction was quenched by cooling to afford a mixture containing a particulate binder (SBR). After adjusting the pH of the mixture containing a particulate binder to 8 by the addition of 5% sodium hydroxide aqueous solution, unreacted monomers were removed by thermal-vacuum distillation. Thereafter, the mixture was cooled to 30° C. or below to afford a water dispersion containing a desired particulate binder (binder for negative electrode mixed material layer).

<Production of Negative Electrode Slurry Composition>

100 parts of synthetic graphite (average particle diameter: 15.6 μm) as a negative electrode active material, 1 part in terms of solid content of 2% aqueous solution of sodium salt of carboxymethyl cellulose ("MAC350HC" from Nippon Paper Industries Co., Ltd.) as a thickener were mixed, ion-exchanged water was added to a solid content concentration of 68%, and mixed for 60 minutes at 25° C. Subsequently, the solid content concentration was adjusted to 62% by the addition of ion-exchanged water, and the mixture was further mixed at 25° C. for 15 minutes. To the mixture obtained were added 1.5 parts in terms of solid content of the water dispersion containing the particulate binder and ion-exchanged water to a final solid content concentration of 52%, and further mixed for 10 minutes. The resultant mixture was subjected to defoaming treatment under reduced pressure to afford a negative electrode slurry composition with good fluidity.

<Manufacture of Negative Electrode>

The negative electrode slurry composition thus obtained was applied by a comma coater onto a 20 μm-thick copper foil (current collector) to a dry film thickness of on the order of 150 μm, and dried. This drying was performed by transporting the copper foil through an oven at 60° C. at a rate of 0.5 m/min over 2 minutes. After that, the copper foil was heat-treated for 2 minutes at 120° C. Thus, a pre-press web of negative electrode was obtained. The pre-press web of negative electrode was rolled with a roll press to afford a post-press negative electrode in which the negative electrode mixed material layer is 80 μm in thickness.

<Production of Positive Electrode Slurry Composition>

100 parts of $LiCoO_2$ as a positive electrode active material (volume-average particle diameter: 12 μm), 2 parts of acetylene black ("HS-100" from Denka Company Limited) as a conductor, 2 parts in terms of solid content of polyvinylidene difluoride ("#7208" from KUREHA Corporation) as a positive electrode binder (binder for positive electrode mixed material layer) were mixed, and N-methylpyrrolidone was added to a total solid content concentration of 70%. These materials were mixed with a planetary mixer to prepare a positive electrode slurry composition.

<Manufacture of Positive Electrode>

The positive electrode slurry composition thus obtained was applied by a comma coater onto a 20 μm-thick aluminum foil (current collector) to a dry film thickness of on the order of 150 μm, and dried. This drying was performed by transporting the aluminum foil through an oven at 60° C. at a rate of 0.5 m/min over 2 minutes. After that, the aluminum foil was heat-treated for 2 minutes at 120° C. Thus, a pre-press web of positive electrode was obtained. The pre-press web of positive electrode was rolled with a roll press to afford a positive electrode.

<Manufacture of Lithium Ion Secondary Battery>

The post-press positive electrode obtained above was cut into a 49 cm×5 cm piece and a 55 cm×5.5 cm cut piece of the separator was placed on the surface of the positive electrode mixed material layer of the positive electrode. Further, the post-press negative electrode obtained above was cut into a 50 cm×5.2 cm piece and placed on the side of the separator opposite to the positive electrode such that the surface of the negative electrode mixed material layer faces the separator. Further, a 55 cm×5.5 cm cut piece of the separator was placed on the surface of the negative electrode on the current collector side. Thereafter, heat pressing was performed for 10 seconds at 80° C. under a pressure of 0.5 MPa to bond together the positive electrode, negative electrode and separator to manufacture a laminate. This laminate was wound up by a winder into a roll. The roll was pressed at 60° C. under a pressure of 0.5 MPa into a flat form and enclosed by an aluminum packaging case as a battery outer package. Electrolysis solution (solvent: EC/DEC/VC (mixing ratio: 68.5/30/1.5 (by volume)); electrolyte: 1M LiPF$_6$) was injected so as not to leave air. In order to tightly seal up the opening of the aluminum outer package, the aluminum package was closed by heat sealing at 150° C. In this way, a spirally wound lithium ion secondary battery with a capacity of 800 mAh was manufactured.

Further, a 55 cm×5.5 cm cut piece of the separator was placed on the positive electrode mixed material layer of the positive electrode cut out in the manner as described above, and heat pressing was performed for 10 seconds at 80° C. under a pressure of 0.5 MPa to provide a laminate having a positive electrode and a separator. Further, a 55 cm×5.5 cm cut piece of the separator was placed on the negative electrode mixed material layer of the negative electrode cut out in the manner as described above, and heat pressing was performed for 10 seconds at 80° C. under a pressure of 0.5 MPa to provide a laminate having a negative electrode and a separator.

The lithium ion secondary battery and laminates obtained as described above were measured for their adhesion to an electrode (adhesion of the functional layer in electrolysis solution), and high-temperature cycle characteristics and low-temperature output characteristics of secondary battery by the methods described above. The results are given in Table 1.

Example 2

Organic particles, particulate polymer for functional layer, composition for non-aqueous secondary battery functional layer, separator, particulate binder for negative electrode, negative electrode slurry composition, negative electrode, positive electrode slurry composition, positive electrode, and lithium ion secondary battery were produced as in Example 1 except that upon production of organic particles the amount of methyl methacrylate was changed to 45 parts and the amount of 1,3-butadiene to 7 parts in the monomer composition for core. Various measurements and evaluations were performed as in Example 1. The results are given in Table 1.

Example 3

Organic particles, particulate polymer for functional layer, composition for non-aqueous secondary battery functional layer, separator, particulate binder for negative electrode, negative electrode slurry composition, negative electrode, positive electrode slurry composition, positive electrode, and lithium ion secondary battery were produced as in Example 1 except that upon production of organic particles the amount of methyl methacrylate was changed to 27 parts, the amount of 1,3-butadiene to 33 parts and the amount of methacrylic acid to 9 parts in the monomer composition for core, and in the monomer composition for shell, the amount styrene was changed to 17 parts and 11 parts of 1,3-butadiene (BD) as an aliphatic conjugated diene monomer unit was newly added. Various measurements and evaluations were performed as in Example 1. The results are given in Table 1.

Example 4

Organic particles, particulate polymer for functional layer, composition for non-aqueous secondary battery functional layer, separator, particulate binder for negative electrode, negative electrode slurry composition, negative electrode, positive electrode slurry composition, positive electrode, and lithium ion secondary battery were produced as in Example 1 except that upon production of organic particles the amount of methyl methacrylate was changed to 19 parts, the amount of 1,3-butadiene to 10 parts and the amount of methacrylic acid to 40 parts in the monomer composition for core. Various measurements and evaluations were performed as in Example 1. The results are given in Table 1.

Example 5

Organic particles, particulate polymer for functional layer, composition for non-aqueous secondary battery functional layer, separator, particulate binder for negative electrode, negative electrode slurry composition, negative electrode, positive electrode slurry composition, positive electrode, and lithium ion secondary battery were produced as in Example 1 except that upon production of organic particles the amount of sodium dodecylbenzene sulfonate as an emulsifier was changed to 1.5 parts. Various measurements and evaluations were performed as in Example 1. The results are given in Table 1.

Example 6

Organic particles, particulate polymer for functional layer, composition for non-aqueous secondary battery functional layer, separator, particulate binder for negative electrode, negative electrode slurry composition, negative electrode, positive electrode slurry composition, positive electrode, and lithium ion secondary battery were produced as in Example 1 except that upon production of organic particles the amount of sodium dodecylbenzene sulfonate as an emulsifier was changed to 0.2 parts. Various measurements and evaluations were performed as in Example 1. The results are given in Table 1.

Example 7

Organic particles, particulate polymer for functional layer, composition for non-aqueous secondary battery functional layer, separator, particulate binder for negative electrode, negative electrode slurry composition, negative electrode, positive electrode slurry composition, positive electrode, and lithium ion secondary battery were produced as in Example 1 except that upon production of organic particles the amount of styrene was changed to 25 parts and the amount of methacrylic acid to 5 parts in the monomer composition for shell. Various measurements and evaluations were performed as in Example 1. The results are given in Table 1

Example 8

Organic particles, particulate polymer for functional layer, composition for non-aqueous secondary battery functional layer, separator, particulate binder for negative electrode, negative electrode slurry composition, negative electrode, positive electrode slurry composition, positive electrode, and lithium ion secondary battery were produced as in Example 1 except that upon preparation of the composition for non-aqueous secondary battery functional layer, the amount of the water dispersion of the acrylic polymer as a particulate polymer for functional layer was changed to 35 parts in terms of solid content and the amount of SN Wet 366 (SAN NOPCO Ltd.; solid content: 70%) as a wetting agent to 2.0 parts in terms of solid content. Various measurements and evaluations were performed as in Example 1. The results are given in Table 1.

Example 9

A 5 MPa pressure resistant vessel equipped with a stirrer was charged with 35 parts of methyl methacrylate (MMA) as a (meth)acrylic acid alkyl ester monomer, 20 parts of 1,3-butadiene (BD) as an aliphatic conjugated diene monomer, 27 parts of styrene (ST) as an aromatic vinyl monomer, 17 parts of methacrylic acid (MAA) as a carboxylic acid group-containing monomer, 1 part of ethylene dimethacrylate (EDMA) as a cross-linkable monomer, 1 part of sodium dodecylbenzene sulfonate as an emulsifier, 150 parts of ion-exchanged water, and 0.5 parts of potassium persulfate as a polymerization initiator. After fully stirred, the temperature was raised to 60° C. to initiate polymerization. Polymerization was continued until the polymerization conversion rate reached 96%, whereby a water dispersion containing organic particles was obtained.

A particulate polymer for functional layer, composition for non-aqueous secondary battery functional layer, separator, particulate binder for negative electrode, negative electrode slurry composition, negative electrode, positive electrode slurry composition, positive electrode, and lithium ion secondary battery were produced as in Example 8 except that organic particles were produced under the condition described above. Various measurements and evaluations were performed as in Example 1. The results are given in Table 1.

Comparative Example 1

Organic particles, particulate polymer for functional layer, composition for non-aqueous secondary battery functional layer, separator, particulate binder for negative electrode, negative electrode slurry composition, negative electrode, positive electrode slurry composition, positive electrode, and lithium ion secondary battery were produced as in Example 1 except that upon preparation of organic particles the amount of methyl methacrylate was changed to 49 parts and the amount of 1,3-butadiene to 3 parts in the monomer composition for core. Various measurements and evaluations were performed as in Example 1. The results are given in Table 1.

Comparative Example 2

Organic particles, particulate polymer for functional layer, composition for non-aqueous secondary battery functional layer, separator, particulate binder for negative electrode, negative electrode slurry composition, negative electrode, positive electrode slurry composition, positive electrode, and lithium ion secondary battery were produced as in Example 1 except that upon preparation of the composition for non-aqueous secondary battery functional layer, the amount of the water dispersion of the acrylic polymer as a particulate polymer for functional layer was changed to 82 parts in terms of solid content and the amount of SN Wet 366 (SAN NOPCO Ltd.; solid content: 70%) as a wetting agent to 20 parts in terms of solid content. Various measurements and evaluations were performed as in Example 1. The results are given in Table 1.

TABLE 1

| | | | Example 1 | Example 2 | Example 3 | Example 4 | Example 5 | Example 6 |
|---|---|---|---|---|---|---|---|---|
| Organic particles | Percentage of aliphatic conjugated diene monomer unit [% by mass] | | 17 | 7 | 44 | 10 | 17 | 17 |
| | Degree of swelling in electrolysis solution [fold] | | 6.3 | 19.0 | 5.3 | 23.5 | 6.3 | 6.3 |
| | Glass-transition temperature [° C.] | | 110 | 110 | 85 | 110 | 110 | 110 |
| | Core | Degree of swelling in electrolysis solution [fold] | 8.5 | 20.0 | 7.1 | 25.0 | 8.5 | 8.5 |
| | | Glass-transition temperature [° C.] | 70 | 85 | 5 | 87 | 70 | 70 |
| | | Composition BD [parts by mass] | 17 | 7 | 33 | 10 | 17 | 17 |
| | | MMA [parts by mass] | 35 | 45 | 27 | 19 | 35 | 35 |
| | | MAA [parts by mass] | 17 | 17 | 9 | 40 | 17 | 17 |
| | | EDMA [parts by mass] | 1 | 1 | 1 | 1 | 1 | 1 |
| | | ST [parts by mass] | — | — | — | — | — | — |
| | Shell | Degree of swelling in electrolysis solution [fold] | 1.3 | 1.3 | 1.3 | 1.3 | 13 | 1.3 |
| | | Glass-transition temperature [° C.] | 110 | 110 | 85 | 110 | 110 | 110 |
| | | Composition BD [parts by mass] | — | — | 11 | — | — | — |
| | | ST [parts by mass] | 28 | 28 | 17 | 28 | 28 | 28 |
| | | MAA [parts by mass] | 2 | 2 | 2 | 2 | 2 | 2 |
| | Core shell ratio [%] | | 10 | 10 | 10 | 10 | 10 | 10 |
| | Ratio of coverage [%] | | 65 | 65 | 65 | 65 | 65 | 65 |
| | Volume-average particle diameter D50 [nm] | | 500 | 500 | 500 | 500 | 270 | 900 |
| | Blending amount [parts by mass] | | 100 | 100 | 100 | 100 | 100 | 100 |
| Blending amount of particulate polymer [parts by mass] | | | 20 | 20 | 20 | 20 | 20 | 20 |
| Blending amount of wetting agent [parts by mass] | | | 1.8 | 1.8 | 1.8 | 1.8 | 1.8 | 1.8 |
| Amount of organic particles in composition (% by mass) | | | 82.1 | 82.1 | 82.1 | 82.1 | 82.1 | 82.1 |

TABLE 1-continued

| Evaluation | Adhesion | A | A | A | A | A | B |
|---|---|---|---|---|---|---|---|
| | Low-temperature output characteristics | A | A | A | A | B | A |
| | High-temperature cycle characteristics | A | B | A | C | A | B |
| | Transition metal trapping ability | A | B | A | A | A | A |

|  |  |  | Example 7 | Example 8 | Example 9 | Comparative Example 1 | Comparative Example 2 |
|---|---|---|---|---|---|---|---|
| Organic particles | Percentage of aliphatic conjugated diene monomer unit [% by mass] | | 17 | 17 | 20 | 3 | 17 |
| | Degree of swelling in electrolysis solution [fold] | | 7.5 | 6.3 | 7.5 | 20.0 | 6.3 |
| | Glass-transition temperature [° C.] | | 130 | 110 | 95 | 150 | 110 |
| | Core | Degree of swelling in electrolysis solution [fold] | 8.5 | 8.5 | 7.5 | 21.5 | 8.5 |
| | | Glass-transition temperature [° C.] | 70 | 70 | 95 | 150 | 70 |
| | | Composition BD [parts by mass] | 17 | 17 | 20 | 3 | 17 |
| | | MMA [parts by mass] | 35 | 35 | 35 | 49 | 35 |
| | | MAA [parts by mass] | 17 | 17 | 17 | 17 | 17 |
| | | EDMA [parts by mass] | 1 | 1 | 1 | 1 | 1 |
| | | ST [parts by mass] | — | — | 27 | — | — |
| | Shell | Degree of swelling in electrolysis solution [fold] | 3.5 | 1.3 | — | 1.3 | 1.3 |
| | | Glass-transition temperature [° C.] | 130 | 110 | — | 110 | 110 |
| | | Composition BD [parts by mass] | — | — | — | — | — |
| | | ST [parts by mass] | 25 | 28 | — | 28 | 28 |
| | | MAA [parts by mass] | 5 | 2 | — | 2 | 2 |
| | Core shell ratio [%] | | 10 | 10 | — | 10 | 10 |
| | Ratio of coverage [%] | | 65 | 65 | — | 65 | 65 |
| | Volume-average particle diameter D50 [nm] | | 500 | 500 | 400 | 500 | 500 |
| | Blending amount [parts by mass] | | 100 | 100 | 100 | 100 | 100 |
| Blending amount of particulate polymer [parts by mass] | | | 20 | 35 | 35 | 20 | 82 |
| Blending amount of wetting agent [parts by mass] | | | 1.8 | 2.0 | 2.0 | 1.8 | 20 |
| Amount of organic particles in composition (% by mass) | | | 82.1 | 73.0 | 73.0 | 82.1 | 49.5 |
| Evaluation | Adhesion | | B | B | C | B | C |
| | Low-temperature output characteristics | | A | A | A | A | C |
| | High-temperature cycle characteristics | | B | B | C | D | D |
| | Transition metal trapping ability | | A | B | A | D | C |

As seen from the results of Examples 1 to 9 given in Table 1, functional layers formed using compositions which contain organic particles containing an aliphatic conjugated diene monomer unit at an amount of 5% by mass or more based on the total monomer units at an amount of 50% by mass or more in terms of solid content exhibit superior adhesion in electrolysis solution and superior transition metal trapping ability. It can be also seen that secondary batteries having the functional layers exhibit superior low-temperature output characteristics and high-temperature cycle characteristics.

On the other hand, as seen from the result of Comparative Example 1 given in Table 1, when the percentage of an aliphatic conjugated diene monomer unit in total monomer units in the organic particles is less than 5% by mass, even when a large amount of organic particles is contained, a functional layer that has superior transition metal trapping ability cannot be obtained. Further, it can also be seen that a secondary battery having superior high-temperature cycle characteristics cannot be obtained.

Further, as seen from the result of Comparative Example 2 given in Table 1, when the amount of organic particles in the composition is less than 50% by mass in terms of solid content, a functional layer that has superior adhesion in electrolysis solution and superior ability of transition metal trapping cannot be obtained. Further, it can also be seen that a secondary battery having superior low-temperature output characteristics and high-temperature cycle characteristics cannot be obtained.

INDUSTRIAL APPLICABILITY

According to the present disclosure, it is possible to provide a composition for non-aqueous secondary battery functional layer that allows for the formation of a functional layer having a high ability of transition metal trapping while ensuring high adhesion.

According to the present disclosure, it is also possible to provide a functional layer having a high ability of transition metal trapping while ensuring high adhesion.

Further, according to the present disclosure, it is possible to provide a non-aqueous secondary battery having excellent life characteristics such as cycle characteristics.

The invention claimed is:

1. A composition for non-aqueous secondary battery functional layer, comprising:
    organic particles containing an aliphatic conjugated diene monomer unit at an amount of 5% by mass or more based on the total monomer units in the organic particles, wherein
    the composition comprises the organic particles at an amount of 70% by mass or more in terms of solid content,
    wherein the composition further comprises organic particles having a core-shell structure with a core and a shell that partially covers an outer surface of the core, wherein
    the core is made of a polymer having a degree of swelling in electrolysis solution of 5 times to 30 times, and
    the shell is made of a polymer having a degree of swelling in electrolysis solution greater than 1 time to 4 times.

2. The composition for non-aqueous secondary battery functional layer of claim 1, wherein the organic particles have a degree of swelling in electrolysis solution of 4 times to 30 times.

3. The composition for non-aqueous secondary battery functional layer of claim 1, wherein the organic particles have a volume-average particle diameter D50 of 250 nm to 1,000 nm.

4. A functional layer for non-aqueous secondary battery, wherein the functional layer is formed from the composition for non-aqueous secondary battery functional layer of claim 1.

5. A non-aqueous secondary battery comprising:
the functional layer for non-aqueous secondary battery of claim 4; and
a positive electrode mixed material layer containing a transition metal-containing positive electrode active material.

6. A composition for non-aqueous secondary battery functional layer, comprising:
organic particles containing an aliphatic conjugated diene monomer unit at an amount of 5% by mass or more based on the total monomer units in the organic particles, wherein
the composition comprises the organic particles at an amount of 50% by mass or more in terms of solid content,
wherein the composition further comprises organic particles having a core-shell structure with a core and a shell that partially covers an outer surface of the core,
the core is made of a polymer having a degree of swelling in electrolysis solution of 5 times to 30 times, and
the shell is made of a polymer having a degree of swelling in electrolysis solution greater than 1 time to 4 times.

* * * * *